(12) United States Patent
Shellhammer et al.

(10) Patent No.: US 12,289,260 B2
(45) Date of Patent: Apr. 29, 2025

(54) PHYSICAL (PHY) LAYER CONTROL FOR WIRELESS LOCAL AREA NETWORK (WLAN) COMMUNICATION

(71) Applicant: QUALCOMM Incorporated, San Diego, CA (US)

(72) Inventors: Stephen Jay Shellhammer, Ramona, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/174,226

(22) Filed: Feb. 24, 2023

(65) Prior Publication Data

US 2023/0283422 A1 Sep. 7, 2023

Related U.S. Application Data

(63) Continuation of application No. 17/180,525, filed on Feb. 19, 2021, now Pat. No. 11,601,239.

(Continued)

(51) Int. Cl.
*H04L 27/26* (2006.01)
*H04L 5/00* (2006.01)

(52) U.S. Cl.
CPC ........ *H04L 5/0044* (2013.01); *H04L 27/2607* (2013.01)

(58) Field of Classification Search
CPC ............. H04L 27/2602; H04L 27/2607; H04L 5/0044; H04L 5/0094; H04W 72/0446; H04W 84/12
See application file for complete search history.

(56) References Cited

U.S. PATENT DOCUMENTS 10,165,551 B2 12/2018 Bharadwaj et al.
2014/0307612 A1\* 10/2014 Vermani ............... H04L 27/261
370/312

(Continued)

FOREIGN PATENT DOCUMENTS

CN 105846978 A 8/2016
WO WO-2016170505 A1 10/2016

(Continued)

OTHER PUBLICATIONS 802 11 Working Group of the LAN/MAN Standards Committee of the IEEE Computer Society: IEEE Draft, Draft, P802.11AX D5.1. IEEE-SA, Piscataway, NJ, USA, vol. 802.11ax, Drafts, No. D5.1, Nov. 6, 2019, (Nov. 6, 2019), pp. 1-770, XP068155342, Retrieved from the Internet: URL: http://www.ieee802.org/11/private/Draft_Standards/11ax/Draft%20P802.11ax_D5.1.pdf . [Retrieved on Nov. 6, 2019]. Paragraph [27.3.6.2]—paragraph [27 .3.6.3].

(Continued)

*Primary Examiner* — Melvin C Marcelo
*Assistant Examiner* — Natali Pascual Peguero
(74) *Attorney, Agent, or Firm* — Arun Swain

(57) ABSTRACT

This disclosure provides methods, devices and systems for wireless communication, and particularly, methods, devices and systems for physical (PHY) layer control signaling. A first physical layer convergence protocol (PLCP) protocol data unit (PPDU) may precede a second PPDU. The first PPDU may be referred to as a PHY control PPDU and may include a physical layer control signaling field (CNT-SIG) that informs one or more stations (STAs) regarding a physical layer configuration they should use for the second PPDU. The PHY control PPDU may enable dynamic subchannel assignments for one or more identified STAs, legacy STAs, or sub-bandwidth operating devices. The techniques of this disclosure may enable sharing of a wide bandwidth wireless (Continued)

channel by different types of devices or different basic service sets (BSSs) assigned to different subchannels of the wireless channel.

20 Claims, 20 Drawing Sheets

Related U.S. Application Data

(60) Provisional application No. 62/983,428, filed on Feb. 28, 2020.

(56) References Cited

U.S. PATENT DOCUMENTS

| | | |
|---|---|---|
| 2016/0057657 A1 | 2/2016 | Seok |
| 2019/0097850 A1 | 3/2019 | Kenney et al. |
| 2019/0174505 A1 | 6/2019 | Kedem et al. |
| 2019/0289612 A1 | 9/2019 | Chen et al. |
| 2021/0144696 A1* | 5/2021 | Cariou ............... H04L 27/2602 |
| 2021/0176763 A1* | 6/2021 | Viger .................. H04W 74/08 |
| 2021/0212035 A1* | 7/2021 | Son ..................... H04W 72/23 |
| 2021/0273757 A1 | 9/2021 | Shellhammer et al. |
| 2021/0297209 A1 | 9/2021 | Shellhammer et al. |

FOREIGN PATENT DOCUMENTS

| | | | |
|---|---|---|---|
| WO | WO-2017027573 | | 2/2017 |
| WO | WO-2018152224 A1 | | 8/2018 |
| WO | WO-2019240792 A1 | | 12/2019 |
| WO | WO-2019240955 | | 12/2019 |
| WO | 2020011684 A1 | | 1/2020 |
| WO | WO-2020175785 A1 | | 9/2020 |
| WO | WO-2021030234 | | 2/2021 |
| WO | WO-2021112532 A1 * | 6/2021 | ............ H04L 5/001 |
| WO | WO-2021172919 A1 | | 9/2021 |
| WO | WO-2021173484 | | 9/2021 |
| WO | WO-2021195021 | | 9/2021 |

OTHER PUBLICATIONS

Cailian, D., et al., "IEEE 802.11be Wi-Fi 7: New Challenges and Opportunities", IEEE Communications Surveys & Tutorials, IEEE, USA, vol. 22, No. 4, Jul. 29, 2020 (Jul. 29, 2020), XP011821374, pp. 2136-2166, DOI: 10.1109/COMST.2020.3012715 [retrieved on Nov. 19, 2020] Section II, Subsection "B. Multi-RU Support", Paragraph 3 Section II, Subsection "C. EHT Preamble Design", Paragraph 4.
Cao R., (NXP): "Aggregated PPDU for Large BW", IEEE Draft, 11-20-0693-00-00BE-Aggregated-PPDU-for-Large-BW, IEEE-SA Mentor, Piscataway, NJ, USA, vol. 802.11 EHT, 802.11be, May 3, 2020 (May 3, 2020), pp. 1-7, XP068167737, Retrieved from the Internet: URL: https://mentor.ieee.org/802.11/dcn/20/11-20-0693-00-00be-aggregated-ppdu-for-large-bw.pptx . [Retrieved on May 3, 2020]. p. 3-p. 5.
Chen, et al., "Design of Forward Compatible OFDMA", Dec. 28, 2019, 10 Pages.
International Search Report and Written Opinion—PCT/US2021/032439—ISA/EPO—Aug. 5, 2021.
International Search Report and Written Opinion—PCT/US2021/019023—ISA/EPO—Jun. 21, 2021.
International Search Report and Written Opinion—PCT/US2021/023581—ISA/EPO—Jun. 25, 2021.
Jinsoo C., et al., "View on EHT Objectives and Technologies", IEEE Draft, 802.11-18/1171R0, IEEE-SA, Mentor, Piscataway, NJ, USA, Jul. 8, 2018 (Jul. 8, 2018), pp. 1-13, XP068128253, Retrieved from the Internet: URL: https://mentor.ieee.org/802.11/dcn/18/11-18-1171-00-0eht-view-on-eht-objectives-and-technologies.pptx . [Retrieved on Aug. 26, 2018] p. 6.
Khorov E., et al., "Current Status and Directions of IEEE 802.11be, the Future Wi-Fi 7", IEEE Access, IEEE, USA, vol. 8, May 7, 2020 (May 7, 2020), XP011789411, pp. 88664-88688, DOI: 10.1109/ACCESS.2020.2993448 [retrieved on May 19, 2020] the whole document, line 8, paragraph 4—right-hand column, line 17.
Liu, J., (Mediatek): "Efficient EHT Preamble Design," IEEE Draft, 11-20-0439-00-00BE-Efficient-EHT-Preamble-Design, IEEE-SA Mentor, Piscataway, NJ USA, vol. 802.11 EHT, 802.11be, Mar. 13, 2020 (Mar. 13, 2020), XP068167041, pp. 1-10, Retrieved from the Internet: URL: https://mentor.ieee.org/802.11/dcn/20/11-20-0439-00-00be-efficient-eht-preamble-design.pptx [retrieved on Mar. 13, 2020] p. 3-p. 6.
Noh Y., (Newracom): "20 MHz Transmission in NGV", IEEE Draft, 11-19-1154-00-00BD-20-MHZ-Transmission-in-ngv, IEEE-SA, Mentor, Piscataway, NJ, USA, vol. 802.11 NGV, 802.11bd, Jul. 14, 2019 (Jul. 14, 2019), pp. 1-15, XP068152923, Retrieved from the Internet: URL: https://mentor.ieee.org/802.11/dcn/19/11-19-1154-00-00bd-20-mhz-transmission-in-ngv.pptx . [Retrieved on Jul. 14, 2019], p. 8.
Park E., (LG Electronics): "Consideration on 320MHz Bandwidth and 16 Spatial Streams", IEEE Draft, 11-19-0778-00-00BE-Consideration-on-320mhz-Bandwidth-and-16-Spatial-Streams, IEEE-SA, Mentor, Piscataway, NJ, USA, vol. 802.11 EHT, 802.11be, May 13, 2019 (May 13, 2019), pp. 1-27, XP068151139, p. 14.
Park E., (LG Electronics): "Phase Rotation Proposal", IEEE Draft, 11-20-0406-00-00BE-Phase-Rotation-Proposal, IEEE-SA, Mentor, Piscataway, NJ, USA, vol. 802.11 EHT, 802.11be, Mar. 15, 2020 (Mar. 15, 2020), pp. 1-11, XP068172683, Retrieved from the Internet: URL: https://mentor.ieee.org/802.11/dcn/20/11-20-0406-00-00be-phase-rotation-proposal.pptx . [Retrieved on Mar. 15, 2020] p. 2-p. 3.
Taiwan Search Report—TW110106090—TIPO—Jul. 4, 2024.

* cited by examiner

1600

1602

TRANSMIT, VIA A WIRELESS CHANNEL, A FIRST PHYSICAL LAYER CONVERGENCE PROTOCOL (PLCP) PROTOCOL DATA UNIT (PPDU) THAT INCLUDES PHYSICAL (PHY) LAYER CONTROL SIGNALING INDICATING AN ASSIGNED SUBCHANNEL OF THE WIRELESS CHANNEL FOR AT LEAST ONE STATION (STA) TO RECEIVE A SECOND PPDU, THE SECOND PPDU OCCUPYING THE ASSIGNED SUBCHANNEL

*Figure 16*

PHYSICAL (PHY) LAYER CONTROL FOR WIRELESS LOCAL AREA NETWORK (WLAN) COMMUNICATION

CROSS-REFERENCE TO RELATED APPLICATIONS

This application is a continuation of U.S. patent application Ser. No. 17/180,525 filed on Feb. 19, 2021, which claims priority to U.S. Provisional Patent Application No. 62/983,428, filed Feb. 28, 2020, and assigned to the assignee hereof. The disclosure of the prior Application is considered part of and is incorporated by reference in this Patent Application.

TECHNICAL FIELD

Aspects of the present disclosure relate generally to wireless communication and to physical (PHY) layer control for wireless local area network (WLAN) communication.

DESCRIPTION OF THE RELATED TECHNOLOGY

A wireless local area network (WLAN) may be formed by one or more access points (APs) that provide a shared wireless communication medium for use by a number of client devices, also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN. New WLAN communication protocols are being developed to support greater bandwidth or to enable enhanced WLAN communication features. As new WLAN communication protocols are developed, there is an opportunity to improve control signaling techniques.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication. The method may be performed by a first access point (AP). The method may include transmitting, via a wireless channel, a first physical layer convergence protocol (PLCP) protocol data unit (PPDU) that includes physical (PHY) layer control signaling. The PHY layer control signaling may indicate an assigned subchannel of the wireless channel for at least one station (STA) to receive a second PPDU. The second PPDU may occupy the assigned subchannel.

Another innovative aspect of the subject matter described in this disclosure can be implemented in a method for wireless communication. The method may be performed by a first station (STA). The method may include receiving, via at least part of a wireless channel, a first physical layer convergence protocol (PLCP) protocol data unit (PPDU) that includes physical (PHY) layer control signaling indicating an assigned subchannel of the wireless channel for the first STA to receive a second PPDU. The method may include adjusting a PHY layer receiver configuration of the first STA based on the PHY layer control signaling to receive the second PPDU in the assigned subchannel.

Another innovative aspect of the subject matter described in this disclosure can be implemented as an apparatus of a first access point (AP). The apparatus may include at least one modem configured to output, via a wireless channel, a first physical layer convergence protocol (PLCP) protocol data unit (PPDU) that includes physical (PHY) layer control signaling indicating an assigned subchannel of the wireless channel for at least one station (STA) to receive a second PPDU, the second PPDU occupying the assigned subchannel.

Another innovative aspect of the subject matter described in this disclosure can be implemented as an apparatus of a first station (STA). The apparatus may include at least one modem configured to obtain, via at least part of a wireless channel, a first physical layer convergence protocol (PLCP) protocol data unit (PPDU) that includes physical (PHY) layer control signaling indicating an assigned subchannel of the wireless channel for the first STA to receive a second PPDU. The apparatus may include at least one processor configured to adjust a PHY layer receiver configuration of the at least one modem based on the PHY layer control signaling. The at least one modem may be configured to obtain the second PPDU via the assigned subchannel.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 16 shows a flowchart illustrating an example process for sending a PPDU with PHY layer control signaling.

Like reference numbers and designations in the various drawings indicate like elements.

DETAILED DESCRIPTION

Figure 1:
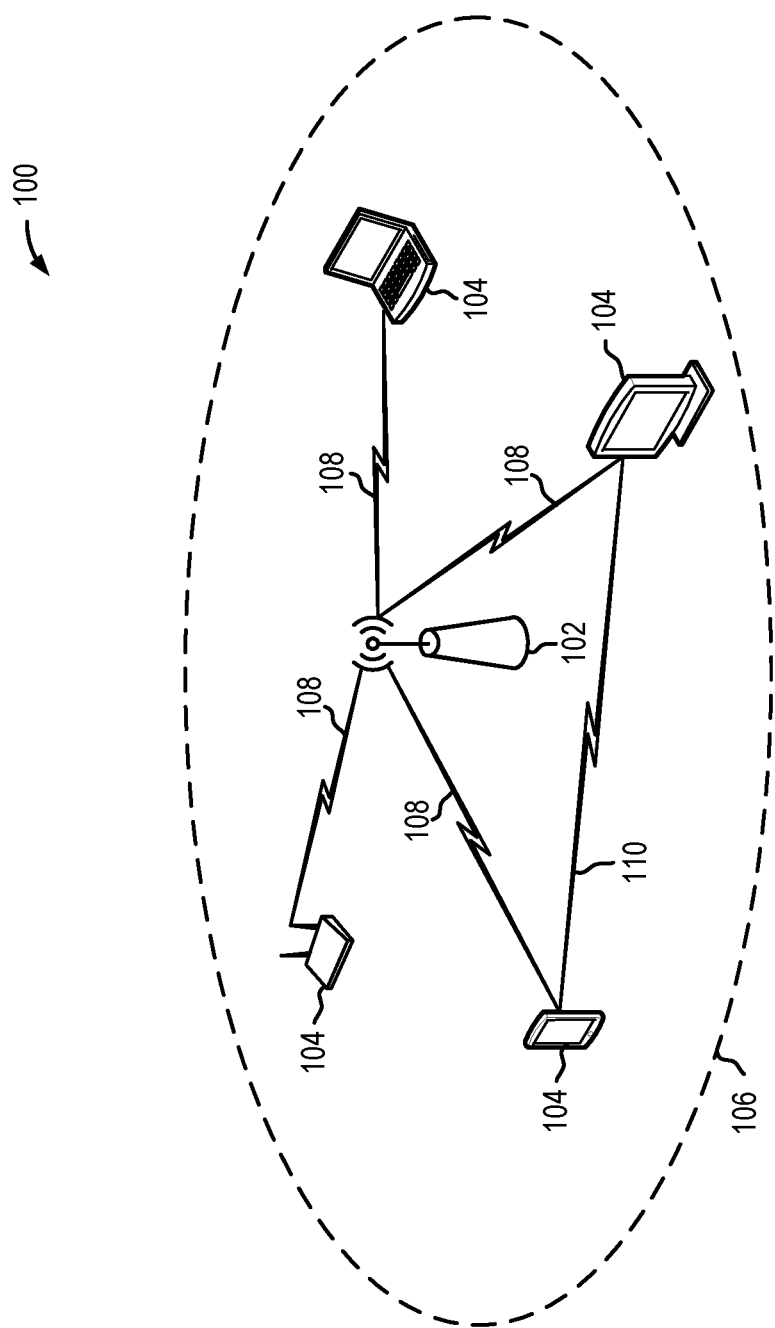
FIG. 1 shows a pictorial diagram of an example wireless communication network.

The following description is directed to certain implementations for the purposes of describing the innovative aspects of this disclosure. However, a person having ordinary skill in the art will readily recognize that the teachings herein can be applied in a multitude of different ways. The examples in this disclosure are based on wireless local area network (WLAN) communication according to the Institute of Electrical and Electronics Engineers (IEEE) 802.11 wireless standards. However, the described implementations may be implemented in any device, system or network that is capable of transmitting and receiving radio frequency (RF) signals according to one or more of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

In a WLAN, a wireless communication device may manage control signaling using media access control (MAC) layer message. For example, MAC layer control signaling may be communicated as a MAC protocol data unit (MPDU) from a first WLAN device to a second WLAN device. The MPDU is encapsulated in a physical (PHY) layer convergence protocol (PLCP) protocol data unit (PPDU). The preamble of the PPDU includes enough information for a PHY layer of a receiver to decode the PPDU and pass the PHY Service Data Unit (PSDU) to the MAC layer for processing. The PSDU typically contains either a single MPDU or an Aggregated MPDU (A-MPDU). The MAC layer processes the A-MPDU/MPDU to retrieve data to pass to a higher layer of the receiver or to obtain control parameters for further communication in a later PPDU.

There may be some scenarios in which the traditional process for changing control settings are inefficient or ineffective. For example, the amount of time used to process a control parameter using the MAC layer may take longer than can be achieved by the PHY layer processing a PPDU to obtain the control parameter. One example scenario may be useful for sub-bandwidth operating devices. A sub-bandwidth operating device is a wireless communication device that operates in a mode that uses a smaller bandwidth than is supported by a wireless channel. The wireless channel may support a higher bandwidth, such as a 320 MHz bandwidth expected in the forthcoming IEEE 802.11be technical specification. A sub-bandwidth operating device, such as an 80 MHz operating device, may be capable of supporting a larger bandwidth, but may be configured to operate using an 80 MHz operating mode to reduce power consumption or reduce complexity, among other examples. While some examples in this disclosure are based on an 80 MHz operating device, the techniques apply to other types of sub-bandwidth operating devices including 20 MHz operating devices.

An access point (AP) (or a group of APs that coordinate transmission) may wish to communicate with an 80 MHz operating device (or group of 80 MHz operating devices) on a particular subchannel of the 320 MHz wireless channel. The current techniques for signaling control information regarding subchannel assignment are time consuming due to MAC layer processing. Thus, one aspect of this disclosure is to provide physical (PHY) layer control signaling in a PPDU that can be processed without MAC layer processing overhead. The PHY layer signaling can be used, for example, to quickly change subchannel assignments for one or more devices in a WLAN.

This disclosure provides systems, methods, and apparatus, including computer programs encoded on computer-readable media, for PHY layer control signaling to at least one station (STA). For example, the PHY layer control signaling may adjust a PHY layer configuration of the STA in preparation for at least a second PPDU. Various implementations relate generally to the use of a first PPDU that can include PHY layer control signaling without MAC layer overhead. The first PPDU may be sent to cause the STA to adjust its PHY layer receiver configuration in advance of a second PPDU that follows the first PPDU. For example, the PHY layer receiver configuration may cause the STA to tune to a particular subchannel of a wireless channel such that the STA can receive the second PPDU in that subchannel. In some implementations, the second PPDU may be part of a collection of PPDUs (which may be collectively referred to as an aggregated PPDU, or A-PPDU) concurrently transmitted in various subchannels. In some implementations, the second PPDU may be part of a combined transmission (referred to as coordinated orthogonal frequency division multiple access (Co-OFDMA)) in which multiple APs concurrently transmit parts of the second PPDU.

In some implementations, using orthogonal frequency division multiple access (OFDMA), a wireless channel may utilize multiple subchannels that can be divided or grouped in a transmission to form different bandwidth portions of the wireless channel. Traditionally, the bandwidth portions may be referred to as resource units (RUs). While this technique is useful for newer devices that implement OFDMA, some legacy devices may not implement OFDMA or may be configured to use a subchannel PHY layer configuration rather than RU settings. In some implementations of this disclosure, a first PPDU may be used to change PHY layer configurations, such as subchannel assignments, for such sub-bandwidth operating devices or other devices that support the techniques in this disclosure. For example, a first PPDU (which may be referred to as a PHY control PPDU)

may include physical layer control signaling to cause a STA to move to a subchannel of the wireless channel assigned for use by the STA or an AP communicating with the STA. The STA can receive a data PPDU at the assigned subchannel. In some implementations, the data PPDU may be formatted according to a legacy format.

In some implementations, a first PPDU may include PHY layer control signaling for multiple STAs. For example, the first PPDU may include multiple user-specific fields. Each user-specific field may identify a particular STA or a group of STAs and the assigned subchannel. In some implementations, the user-specific field may identify a basic service set (BSS) managed by an AP. The BSS includes the AP and those STAs associated with the AP. Thus, a first PPDU may include a user-specific field to assign a subchannel for use by the BSS during a second PPDU in the assigned subchannel. In some implementations, a user-specific field may identify a BSS using a BSS identifier (BSSID), a BSS color, or an extended BSS color.

In some implementations, the first PPDU may include a BSS color extension field. Combined with a traditional BSS color field, the BSS color extension field may reduce the likelihood of BSS color collisions and may permit sharing by multiple overlapping BSSs in different subchannels of the wireless channel. In some implementations, the extended BSS color may be used to identify an AP and associated STAs that are assigned to a particular subchannel of the wireless channel.

In some implementations, the techniques in this disclosure may support Co-OFDMA communication. Co-OFDMA enables multiple APs to share a wireless channel by concurrently transmitting data PPDUs in different subchannels of the wireless channel. In some implementations, a first PPDU (formatted as a PHY control PPDU) may be used during a setup phase for Co-OFDMA. The first PPDU may indicate which APs (and their respective BSSs) are assigned to the various subchannels of the wireless channel after the first PPDU.

In some implementations, multiple coordinating APs may concurrently transmit the first PPDU (as a PHY control PPDU) so that STAs in the vicinity of any of the coordinating APs can receive the first PPDU. Because there is a possibility that some STAs may receive the first PPDU from more than one STA, this disclosure includes techniques to address multipath delay differences. For example, in some implementations, the first PPDU may use a long cyclic prefix for each symbol of the PHY layer control signaling. In some implementations, the first PPDU may include signaling to inform the STA that the PHY layer control signaling is modulated with a long cyclic prefix rather than the standard length cyclic prefix.

In some implementations, the PHY layer control signaling may be included in a physical layer control signal field (CNT-SIG) of the first PPDU. In some implementations, the CNT-SIG may follow a universal signal field (U-SIG) in the first PPDU. The U-SIG may include an indicator that the PPDU includes the CNT-SIG. Alternatively, or additionally, the U-SIG may indicate that the first PPDU includes PHY layer control signaling and a receiving STA may infer that the CNT-SIG is included. In some implementations, the CNT-SIG may be included in an Extremely High Throughput (EHT) signal field (EHT-SIG) that follows the U-SIG in the first PPDU. Alternatively, the CNT-SIG may replace the EHT-SIG that would otherwise normally follow the U-SIG. In some implementations, the CNT-SIG may follow an EHT-SIG of the first PPDU. For example, the EHT-SIG may include an indicator to indicate that the CNT-SIG follows the EHT-SIG.

In some implementations, the CNT-SIG may include different types of physical layer control signaling. Some of the examples in this disclosure are based on controlling a subchannel assignment for one or more STAs or BSSs. However, the techniques also may be useful in signaling other types of physical layer configuration parameters. For example, the physical layer control signaling may inform a STA regarding what type of data PPDU will be transmitted following the first PPDU. Other types of physical layer configuration parameters that can be controlled by PHY layer control signaling may include a PHY layer transmission power setting, a PHY layer receiver gain setting, a modulation and coding rate the data PPDU, decoding information to aid the at least STA in decoding the data PPDU, or a control setting that is specific to the data PPDU, among other examples. In some implementations, the PHY layer control signaling may be used to dynamically control physical layer configurations before a data PPDU such that the physical layer control may be changed on a per-data-PPDU basis.

Particular implementations of the subject matter described in this disclosure can be implemented to realize one or more of the following potential advantages. In some implementations, the described techniques may enable a data PPDU on a wireless channel to be shared by different types of STAs or different BSSs occupying different subchannels of the wireless channel. In some implementations, PHY layer control signaling may enable a dynamic subchannel assignment to move a STA or group of STAs to a subchannel for a data PPDU. The techniques in this disclosure may support sub-bandwidth operating devices to utilize a physical layer configuration for a portion of a wireless channel that is dynamically controlled by physical layer control signaling. The use of sub-bandwidth operation mode may enable power savings for the sub-bandwidth operating device as well as spectral efficiency for the wireless channel. For example, in some implementations, the PHY layer control signaling may be used to move newer devices (such as those that understand the PHY layer control signaling) to a different subchannel so that legacy devices (that do not recognize the PHY layer control signaling) can continue to use legacy PPDUs in a portion of the wireless channel bandwidth. In some implementations, the PHY layer control signaling can instruct a STA to listen on a particular subchannel. For example, the PHY layer control signaling in a first PPDU may cause some STAs to tune to a second subchannel (which may be referred to as a secondary 160 MHz channel within a 320 MHz channel) while other STAs may remain tuned to a first subchannel (which may be referred to as a primary 160 MHz channel within a 320 MHz channel). In some implementations, the second PPDU following the first PPDU may be an aggregated PPDU (A-PPDU) or a Multi-generation PPDU. The A-PPDU or Multi-generation PPDU may be constructed from parallel PPDUs, one PPDU of the A-PPDU on the first subchannel and a different PPDU of the A-PPDU on the second subchannel. The STAs listening on the second subchannel can decode a PPDU of the A-PPDU on the secondary 160 MHz channel while the other STAs listening to first subchannel can decode the different PPDU of the A-PPDU on the primary 160 MHZ channel. This allows for very efficient use of the spectrum since both types of STAs can be served with the A-PPDU while using a full wireless channel bandwidth (such as 320 MHz). The techniques of this disclosure also may support coordinated OFDMA by multiple APs that share the wireless channel using different subchannels within the wireless channel.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While one AP 102 is shown, the WLAN 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple channels (which may be used as subchannels of a larger bandwidth channel as described below). For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels (which may be referred to as subchannels).

Each PPDU is a composite structure that includes a PHY preamble and a payload in the form of a PLCP service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a first portion (or "legacy preamble") and a second portion (or "non-legacy preamble"). The first portion may be used for packet detection, automatic gain control and channel estimation, among other uses. The first portion also may generally be used to maintain compatibility with legacy devices as well as non-legacy devices. The format of, coding of, and information provided in the second portion of the preamble is based on the particular IEEE 802.11 protocol to be used to transmit the payload.

Figure 2:
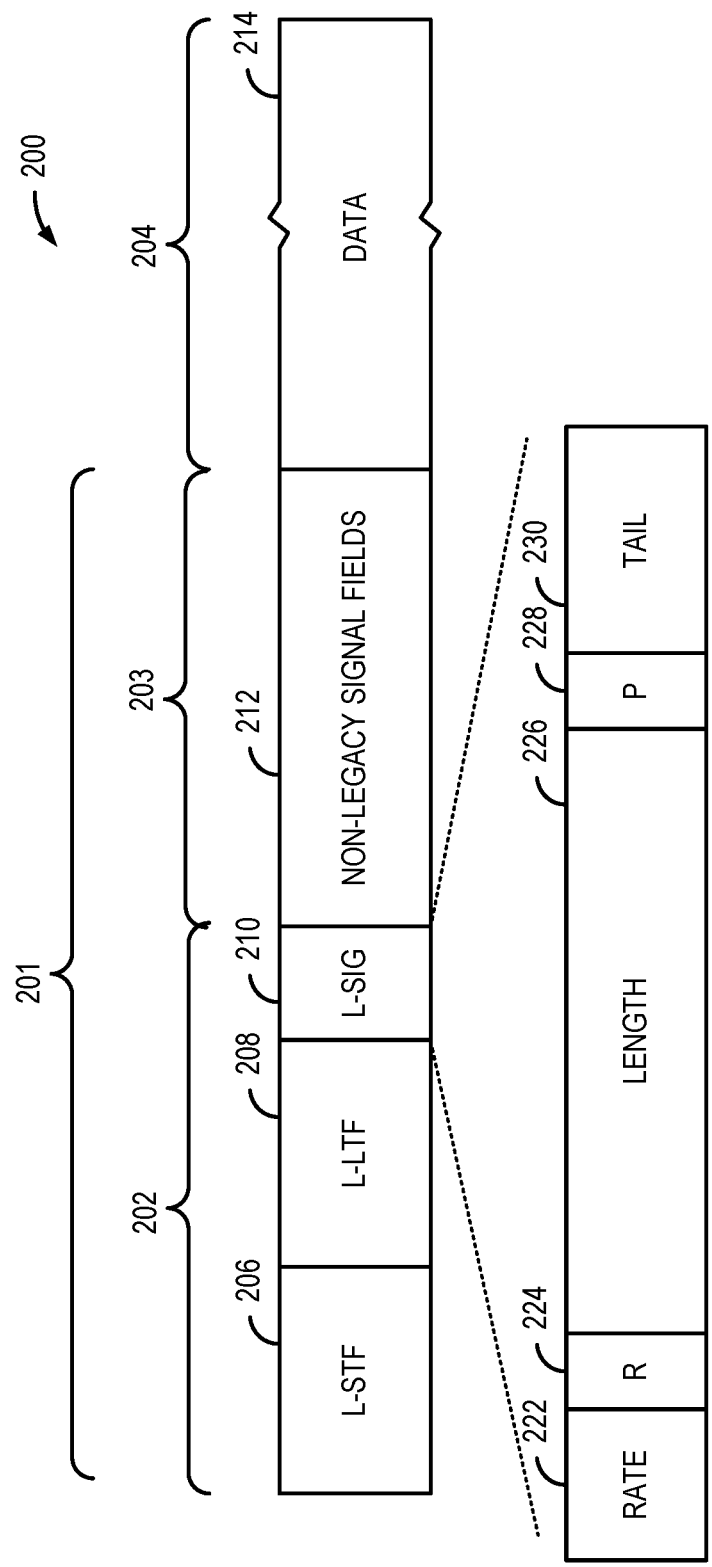
FIG. 2 shows an example physical layer convergence protocol (PLCP) protocol data unit (PPDU) usable for communications between an access point (AP) and a number of stations (STAs).

FIG. 2 shows an example PPDU usable for communications between an AP and a number of stations STAs. As shown, the PPDU 200 includes a PHY preamble 201 and a PHY payload 204. For example, the preamble 201 may include a first portion 202 that itself includes a legacy short training field (L-STF) 206, which may consist of two BPSK symbols, a legacy long training field (L-LTF) 208, which may consist of two BPSK symbols, and a legacy signal field (L-SIG) 210, which may consist of one BPSK symbol. The first portion 202 of the preamble 201 may be configured according to the IEEE 802.11a wireless communication protocol standard.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PPDU and to use the determined duration to avoid transmitting on top of the PPDU. For example, the L-STF 206, the L-LTF 208 and the L-SIG 210 may be modulated according to a binary phase shift keying (BPSK) modulation scheme. FIG. 2 shows an example L-SIG 210 in the PPDU 200. L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors.

The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

The preamble 201 may also include a second portion 203 including one or more non-legacy signal fields 212, for example, conforming to an IEEE wireless communication protocol such as the IEEE 802.11ac, 802.11ax, 802.11be or later wireless communication protocol standards. In some implementations, the second portion 203 of the preamble 201 may include a repeat of the L-SIG (RL-SIG, not shown) before the non-legacy signal fields 212. To accommodate later versions of the IEEE wireless communication protocols, some of the L-SIG 210 fields (such as the data rate field 222 and length field 226) have been redefined or overloaded with new definitions. For example, the data rate field 222 and the length field 226 may be populated with values to identify a type of non-legacy signal fields 212 that will follow. The non-legacy signal fields 212 may include a universal signal field (U-SIG, not shown) that is constructed to indicate a type of PPDU, a version of the wireless communication protocol associated with the PPDU, a bandwidth, puncturing, or any combination thereof. As described further in this description, the non-legacy signal fields 212 also may include a physical layer control signal field (CNT-SIG, not shown).

Following the non-legacy signal fields 212, the PPDU 200 may include a payload 204. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 3:
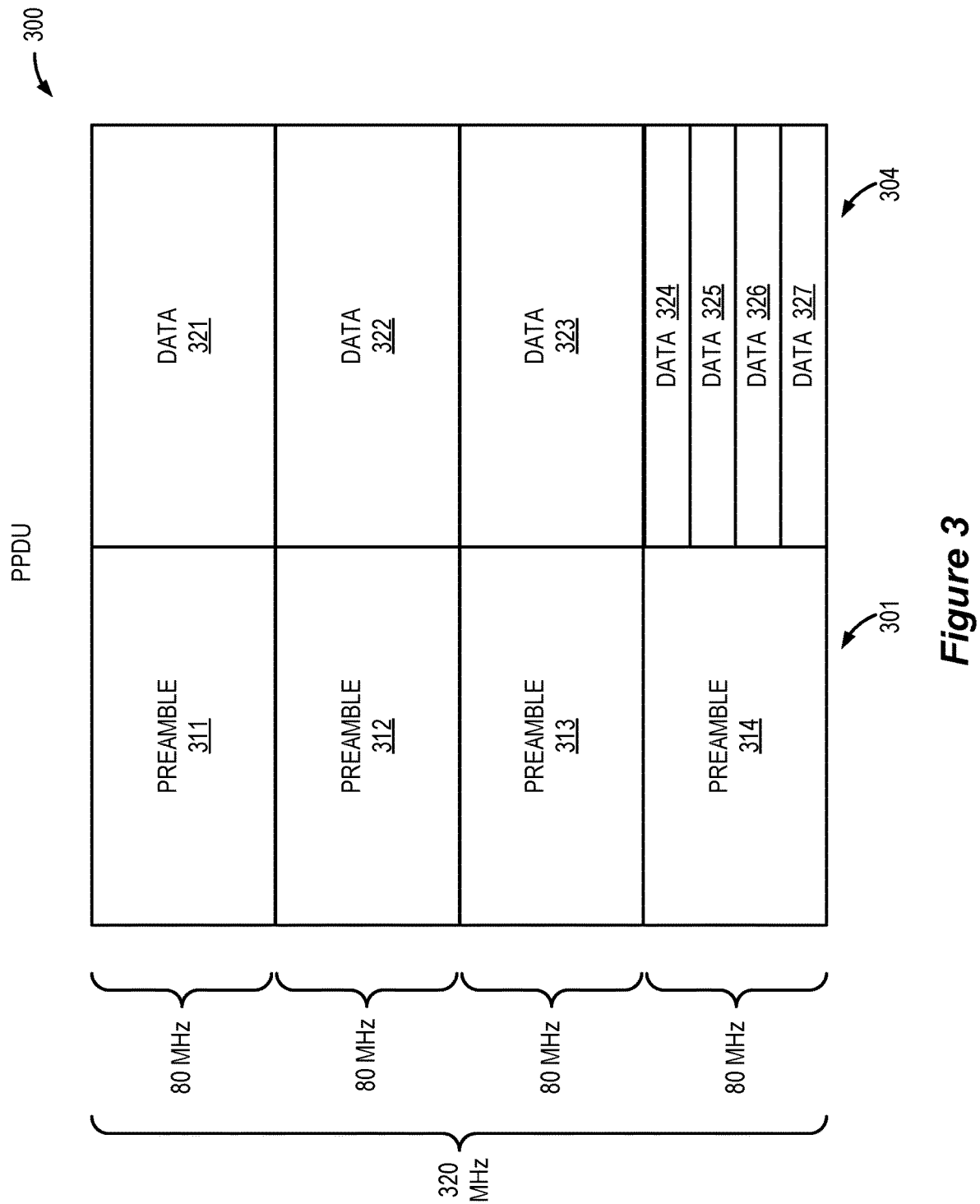
FIG. 3 shows an example PPDU that supports orthogonal frequency division multiple access (OFDMA).

FIG. 3 shows an example PPDU 300 that supports OFDMA. The PPDU 300 may span a wide bandwidth wireless channel. In the example of FIG. 3, the wireless channel has a 320 MHz bandwidth. The PPDU 300 includes a PHY preamble 301 and a PHY payload 304. Each 80 MHz subchannel of the wireless channel may include a different preamble portion that is specific to that 80 MHz subchannel. For example, a first preamble portion 311 may include signaling regarding RU allocations, subchannel puncturing, or other signaling related to a first data payload portion 321 in a first 80 MHz subchannel of the wireless channel. The preamble portions 311, 312, 313, and 314 include signaling for their corresponding 80 MHz subchannels of the wireless channel. The preamble portions 311, 312, and 313 include signaling for 80 MHz bandwidth data payload portions 321, 322, and 323, respectively. Each 80 MHz subchannel may include multiple smaller subchannels. For example, each 80 MHz subchannel may include four 20 MHz subchannels. To illustrate the use of smaller subchannels, the example PPDU 300 includes a fourth preamble portion 314 for the fourth 80 MHz subchannel that is divided into four data payload portions 324, 325, 326, and 327. Each of the data payload portions 321-327 may be assigned to different users to send or receive data.

Figure 4:
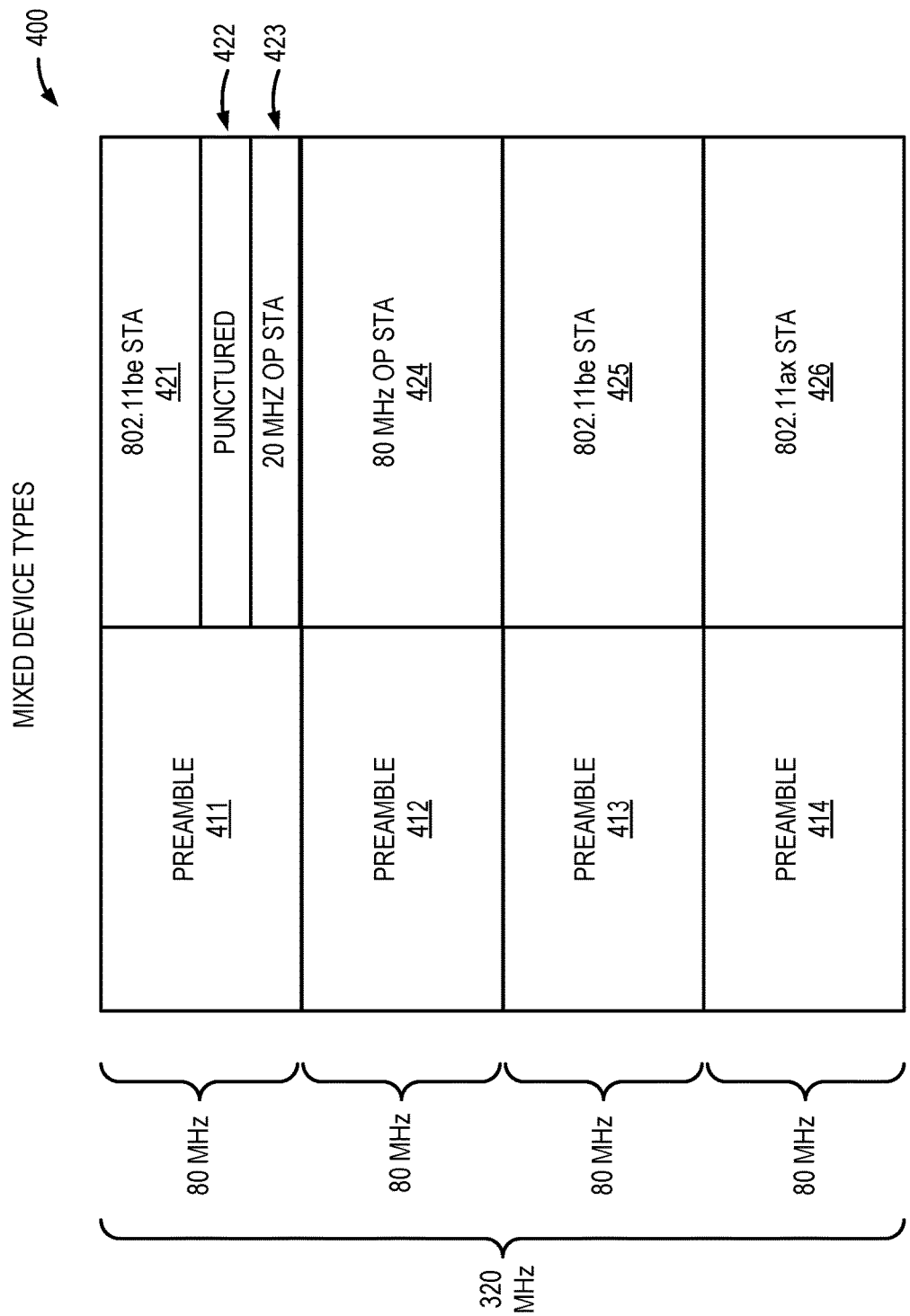
FIG. 4 shows an example PPDU using OFDMA with different types of STAs.

FIG. 4 shows an example PPDU using OFDMA with different types of STAs. As described herein, some implementations of this disclosure may support mixing of different types of STAs so that they can coexist and share a wide bandwidth wireless channel. The example PPDU 400 in FIG. 4 may be an example of a data PPDU that includes data payload portions for different types of STAs. For example, a first 80 MHz subchannel may be divided to include an RU allocation 421 for an IEEE 802.11be STA, a punctured subchannel 422, and a 20 MHz bandwidth subchannel 423 allocated for a 20 MHz operating device. The first preamble portion 411 may include the signaling for the RU allocation 421, the punctured subchannel 422, and the 20 MHz bandwidth subchannel 423. A second preamble portion 412 may include signaling for an 80 MHz operating STA to use a second data payload portion 424. A third preamble portion 413 may indicate that the third data payload portion 425 is directed to another IEEE 802.11be STA. A fourth preamble portion 414 may indicate that the fourth data payload portion 426 is for an IEEE 802.11ax STA.

Because the preamble portions 411, 412, 413, and 414 are self-contained—meaning they include the signaling needed for each of their corresponding 80 MHz subchannels—the various devices may receive the preamble portion and data payload portion for their respective 80 MHz subchannel. This is useful, for example, for a legacy device or sub-bandwidth operating device to tune to a fraction (such as a 20 MHz subchannel or 80 MHz subchannel) of the wide bandwidth wireless channel. However, the current mechanisms to inform the legacy device or sub-bandwidth operating device which subchannel to use are time consuming. For example, the current techniques may use MAC layer processing. Typically, the MAC layer processing and changes to assigned subchannels are intended for long term assignment of subchannels. The techniques in this disclosure may support fast changes to subchannel assignments using PHY layer control signaling. The changes may be made using PHY layer control signaling (not shown) which informs the STA regarding a particular subchannel will include the data PPDU for that device. The PHY layer control signaling is further described with reference to FIGS. 6 and 7.

Figure 5:
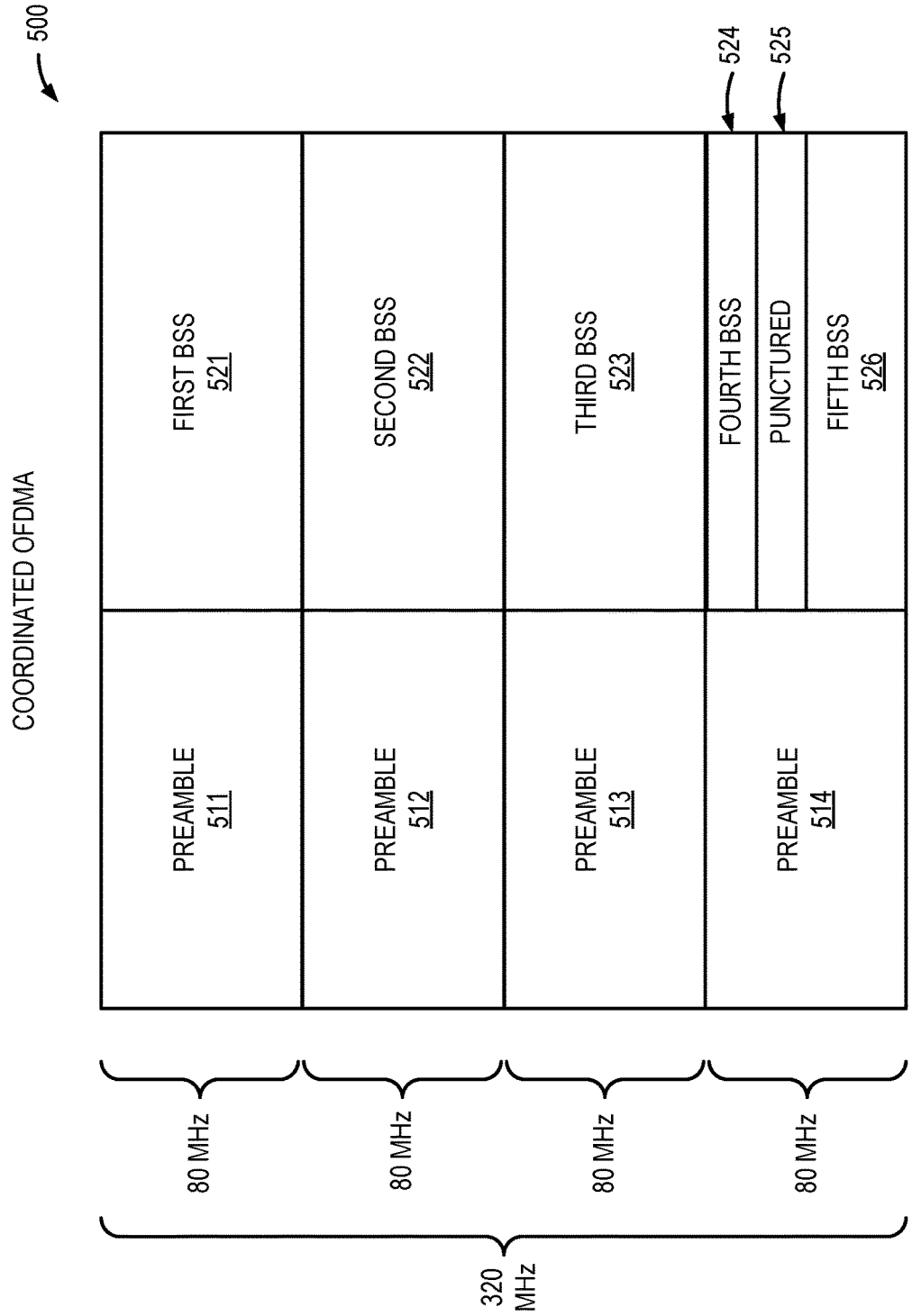
FIG. 5 shows an example PPDU using coordinated OFDMA (Co-OFDMA) by different basic service sets (BSSs).

FIG. 5 shows an example PPDU 500 using Co-OFDMA by different BSSs. Similar to the example in FIG. 4, FIG. 5 illustrates an example of using a wide bandwidth channel for different devices. FIG. 5 supports whole BSSs using different subchannels within the wide bandwidth wireless channel. In the example of FIG. 5, five different APs may concurrently transmit data payload portions 521, 522, 523, 524, and 526 to their respective BSSs. The preamble portions 511, 512, 513, and 514 may be concurrently signaled by the various APs that use each 80 MHz bandwidth portion of the wireless channel. For example, a first AP may signal the first preamble portion 511 and first data payload portion 521 in a first 80 MHz subchannel. In the example of FIG. 5, the fourth 80 MHz subchannel may be shared by multiple APs. For example, a fourth AP (managing a fourth BSS) and a fifth AP (managing a fifth BSS) may concurrently transmit a same fourth preamble portion 514. The fourth preamble portion 514 may indicate the RU allocation or subchannel puncturing for the fourth 80 MHz subchannel. For example, the fourth preamble portion 514 may indicate that the fourth AP will transmit data to the fourth BSS in a fourth data payload portion 524 and that the fifth AP will transmit data to the fifth BSS in a fifth data payload portion 526. The fourth preamble portion 514 also may indicate a punctured subchannel 525 within the fourth 80 MHz subchannel.

In some implementations, the data PPDU 500 may be referred to as a collection of concurrently transmitted PPDUs, such that each AP transmits a BSS-specific PPDU on its assigned subchannel, and the BSS-specific PPDUs collectively form the Co-OFDMA transmission shown as data PPDU 500. As described with reference to FIG. 4, the Co-OFDMA example in FIG. 5 may benefit from having PHY layer control signaling in a first PPDU (not shown) that precedes the data PPDU 500. For example, a first PPDU may include PHY layer control signaling to inform the STAs of each BSS regarding which subchannel will include a BSS-specific PPDU for their BSS. The first PPDU is further described with reference to FIGS. 6 and 7.

Figure 6:
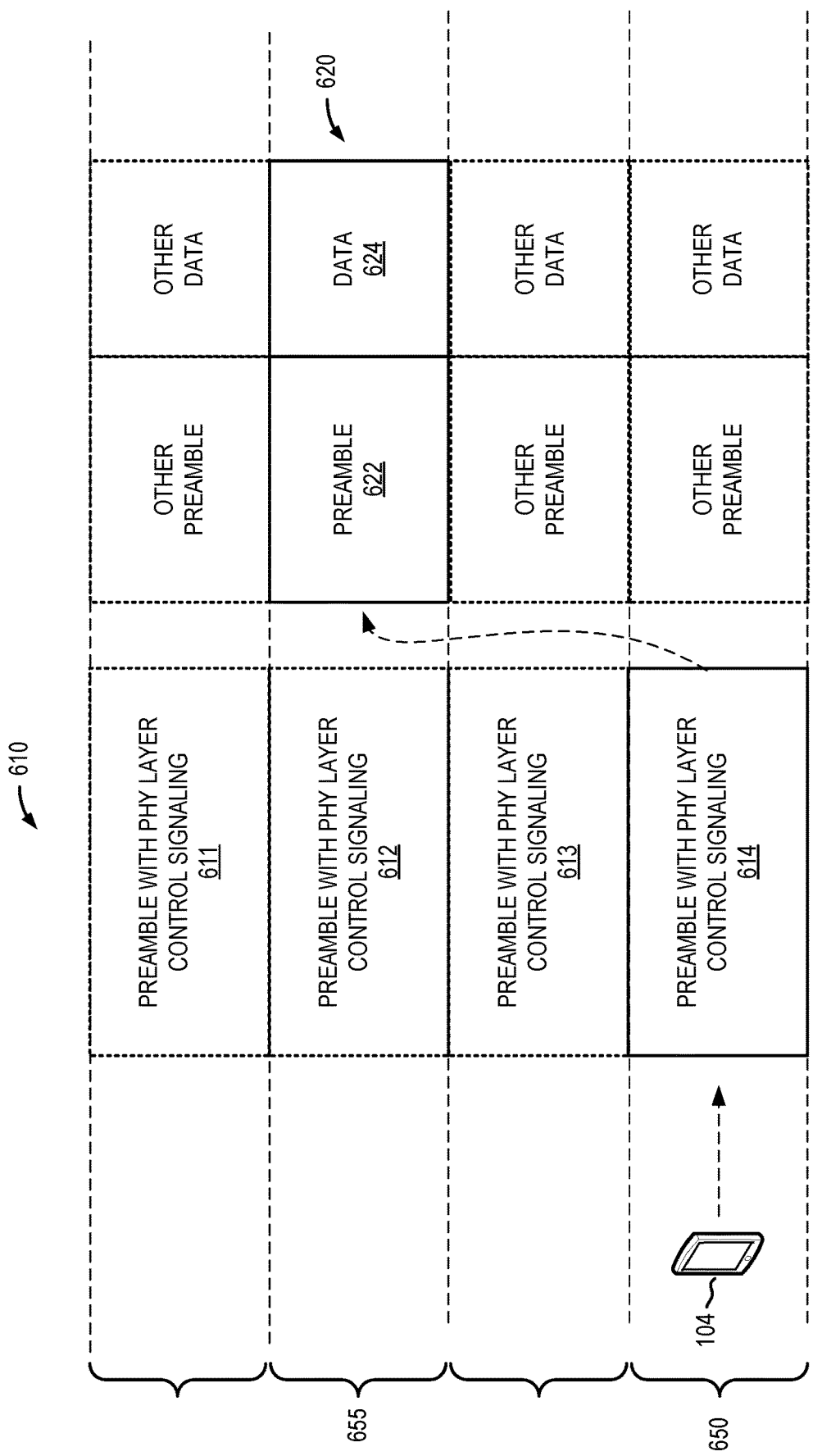
FIG. 6 shows an example scenario in which a first PPDU includes physical (PHY) layer control signaling to move a STA to a different subchannel for a second PPDU.

FIG. 6 shows an example scenario in which a first PPDU includes physical (PHY) layer control signaling to move a STA to a different subchannel for a second PPDU. In the example scenario, the STA 104 is an 80 MHz operating STA that is initially configured to use a primary 80 MHz subchannel 650. A first PPDU 610 (formatted as a PHY control PPDU) may include PHY layer control signaling that informs the STA 104 to tune to a secondary 80 MHz subchannel 655 for a second PPDU 620 (data PPDU). The first PPDU 610 may include a preamble with PHY layer control signaling 611, 612, 613, and 614 in each of the 80 MHz subchannels in the wireless channel. In the example scenario, the STA 104 is an 80 MHz operating STA that listens to a particular 80 MHz bandwidth portion. The STA\s 104 receives the PHY layer control signaling 614 in the primary 80 MHz subchannel 650 portion of the first PPDU 610. Based on the PHY layer control signaling, the STA 104 may determine that it should tune to the secondary 80 MHz subchannel 655. The STA 104 receives the preamble 622 and data payload 624 of the second PPDU 620. The second PPDU 620 may be formatted using a legacy PPDU format (such as IEEE 802.11ax or earlier standards) for an 80 MHz PPDU. Meanwhile, other devices (not shown) may receive other preamble and other data on the other 80 MHz subchannels, including the primary 80 MHz subchannel 650 that is no longer assigned to the STA 104. Thus, the ability to dynamically move particular STAs (or BSSs) to assigned subchannels enables a wireless local area network to efficiently use the spectrum of the wide bandwidth channel. Although described as segments of 80 MHz subchannels, the techniques of FIG. 6 could be applied to other combinations of subchannel sizes (such as two 160 MHz subchannels).

Figure 7:
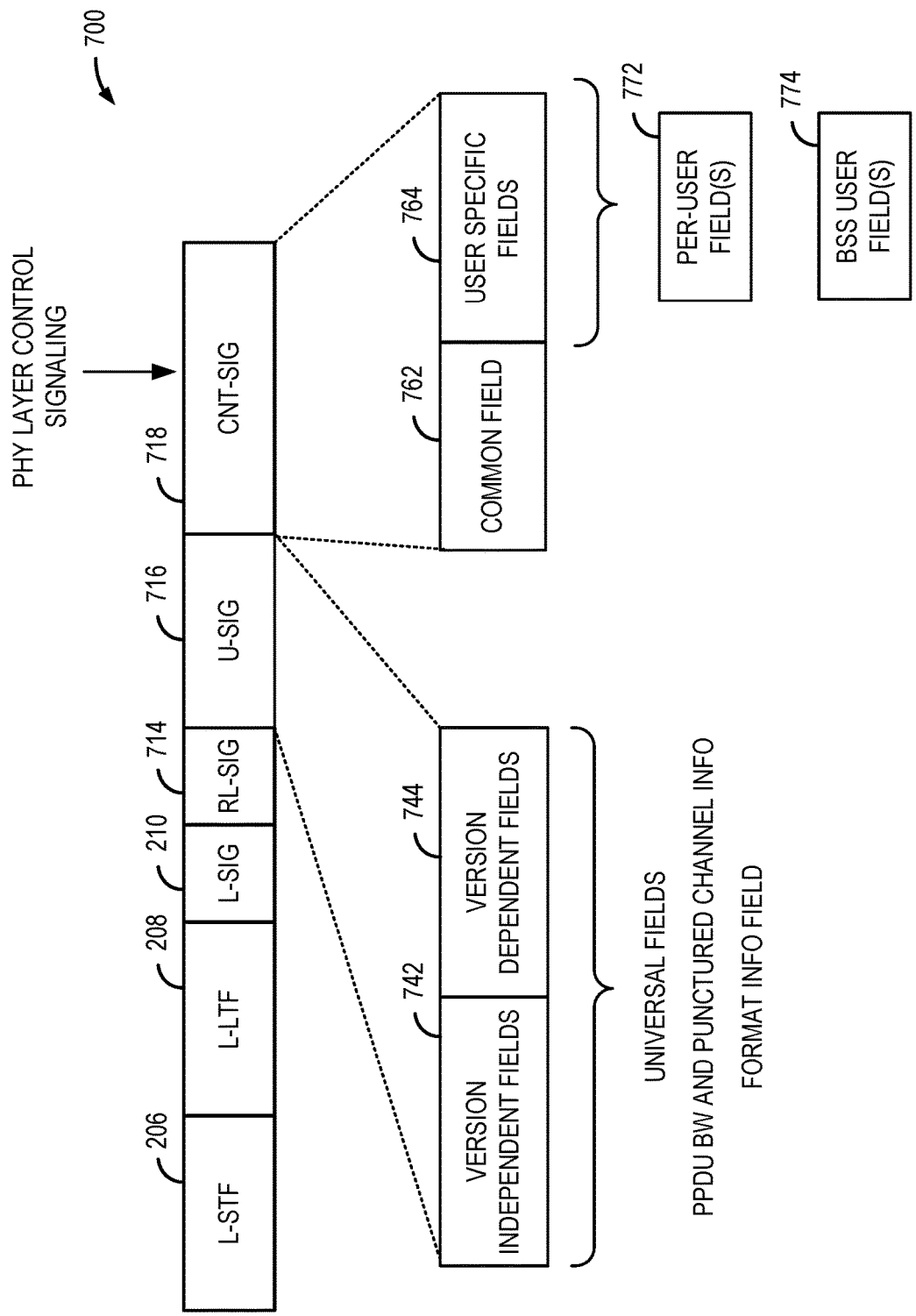
FIG. 7 shows an example PPDU with PHY layer control signaling.

FIG. 7 shows an example PPDU 700 with PHY layer control signaling. The PPDU 700 may include a U-SIG 716 that, among other things, may indicate a format of the PPDU, a version of the wireless communication protocol (for example, the Extreme High Throughput (EHT) protocol defined in 802.11be), a bandwidth, puncturing, or any combination thereof. Thus, the U-SIG 716 may precede version-specific signaling that is formatted in accordance with the IEEE 802.11be amendment to the IEEE 802.11 wireless communication protocol standard, or may be formatted as a preamble and frame, respectively, conforming to any later (post-EHT) version of a new wireless communication protocol conforming to a future IEEE 802.11 wireless communication protocol standard or other standard. In the forthcoming IEEE 802.11be technical specification, the U-SIG 716 would be followed by an EHT signaling field (EHT-SIG, not shown). As described in this disclosure, the PPDU 700 may include a physical layer control signal field (CNT-SIG) 718 after the U-SIG 716. Thus, the CNT-SIG 718 may replace the EHT-SIG when the PPDU includes PHY layer control signaling.

The legacy preamble portion of the PPDU 700 includes an L-STF 206, an L-LTF 208, and an L-SIG 210, as described with reference to FIG. 2. A non-legacy preamble portion of the PPDU 700 a repeated legacy signal field (RL-SIG) 714.

Following the RL-SIG 714, the non-legacy preamble includes the U-SIG 716. The U-SIG 716 may include version independent fields 742 and version dependent fields 744. Examples of the version independent fields 742 may include a universal fields (such as a version identifier, an indication of whether the PPDU 700 is an uplink (UL) or a downlink (DL) PPDU, a BSS color, and a transmission opportunity (TxOP) duration, among other examples. The version identifier in the version independent fields 742 may indicate a version (and associated format) for the version dependent fields 744. In some implementations, the version dependent fields 744 may indicate a PPDU format (such as in a format information field). The PPDU format may determine which other indicators are included in the version dependent fields 744 as well as the format or contents of the rest of U-SIG 716 and the CNT-SIG 718. In some implementations, U-SIG 716 may include PPDU bandwidth (BW) and punctured channel information.

The CNT-SIG 718 may include a common field 762 and one or more user specific fields 764. The common field 762 may indicate the quantity of user specific fields 764. In some implementations, the common field 762 also may indicate whether the user specific fields 764 are per-user fields 772 or BSS user fields 774. Alternatively, each user specific field may include an indicator to indicate whether it is a per-user field 772 or a BSS user field 774. Each user specific field may include physical layer control signaling for one or more STAs. For example, a per-user field 772 may be used to identify a STA and indicate which subchannel that STA should use for the next PPDU. A BSS user field 774 may be used to indicate a BSS and which subchannel that BSS should use for the next PPDU. Further examples of the user specific fields 764 are included in this description with reference to FIGS. 10-12.

In different implementations, the PPDU 700 formatted as a first PPDU (having PHY layer control signaling) may include or omit the data payload portion (not shown). For example, in some implementations, the first PPDU may end after the CNT-SIG and may not include the data payload portion after the physical layer control signaling. Instead, the next PPDU (such as a data PPDU) may follow the first PPDU after a period of time, such as a short interframe space (SIFS) period.

Figure 8:
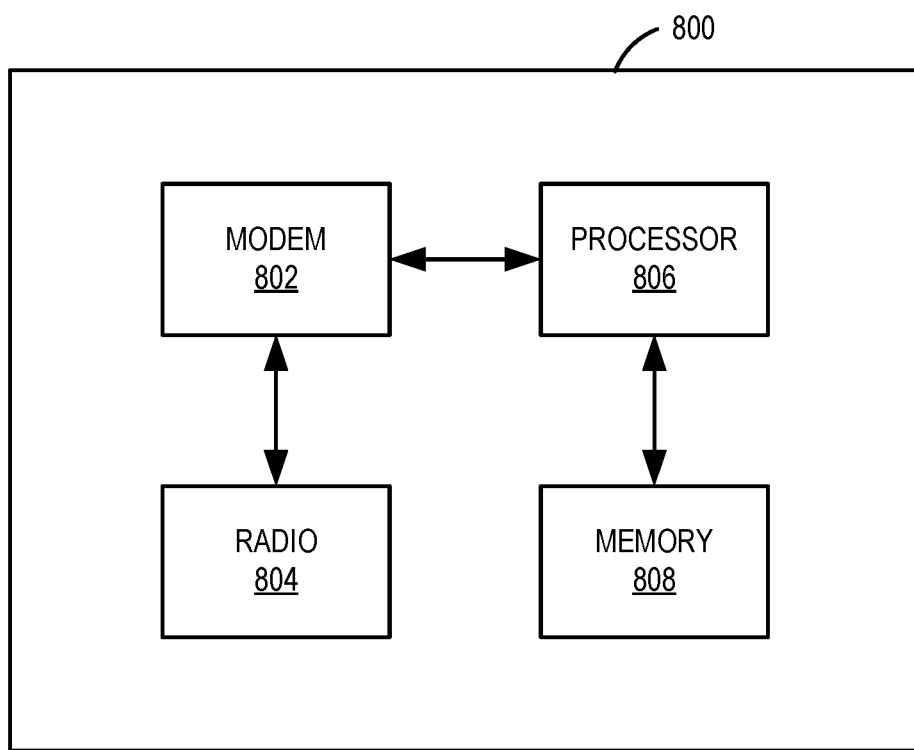
FIG. 8 shows a block diagram of an example wireless communication device.

FIG. 8 shows a block diagram of an example wireless communication device 800. In some implementations, the wireless communication device 800 can be an example of a device for use in a STA such as one of the STAs 104 described with reference to FIG. 1. In some implementations, the wireless communication device 800 can be an example of a device for use in an AP such as the AP 102 described with reference to FIG. 1. The wireless communication device 800 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 800 can be, or can include, a chip, system on chip (SoC), chipset, package or device that includes one or more modems 802, for example, a Wi-Fi (IEEE 802.11 compliant) modem. In some implementations, the one or more modems 802 (collectively "the modem 802") additionally include a WWAN modem (for example, a 3GPP 4G LTE or 5G compliant modem). In some implementations, the wireless communication device 800 also includes one or more radios 804 (collectively "the radio 804"). In some implementations, the wireless communication device 800 further includes one or more processors, processing blocks or processing elements 806 (collectively "the processor 806") and one or more memory blocks or elements 808 (collectively "the memory 808").

The modem 802 can include an intelligent hardware block or device such as, for example, an application-specific integrated circuit (ASIC) among other possibilities. The modem 802 is generally configured to implement a PHY layer. For example, the modem 802 is configured to modulate packets and to output the modulated packets to the radio 804 for transmission over the wireless medium. The modem 802 is similarly configured to obtain modulated packets received by the radio 804 and to demodulate the packets to provide demodulated packets. In addition to a modulator and a demodulator, the modem 802 may further include digital signal processing (DSP) circuitry, automatic gain control (AGC), a coder, a decoder, a multiplexer and a demultiplexer. For example, while in a transmission mode, data obtained from the processor 806 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 804. In implementations involving beamforming, the modulated symbols in the respective spatial streams are precoded via a steering matrix prior to their provision to the IFFT block.

While in a reception mode, digital signals received from the radio 804 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 806) for processing, evaluation, or interpretation.

The radio 804 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 800 can include, or be coupled with, multiple transmit antennas (each with a corresponding transmit chain) and multiple receive antennas (each with a corresponding receive chain). The symbols output from the modem 802 are provided to the radio 804, which then transmits the symbols via the coupled antennas. Similarly, symbols received via the antennas are obtained by the radio 804, which then provides the symbols to the modem 802.

The processor 806 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 806 processes information received through the radio 804 and the modem 802, and processes information to be output through the modem 802 and the radio 804 for transmission through the wireless medium. For example, the processor 806 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 806 may generally control the modem 802 to cause the modem to perform various operations described above.

The memory 808 can include tangible storage media such as random-access memory (RAM) or read-only memory (ROM), or combinations thereof. The memory 808 also can store non-transitory processor- or computer-executable software (SW) code containing instructions that, when executed by the processor 806, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 9B:
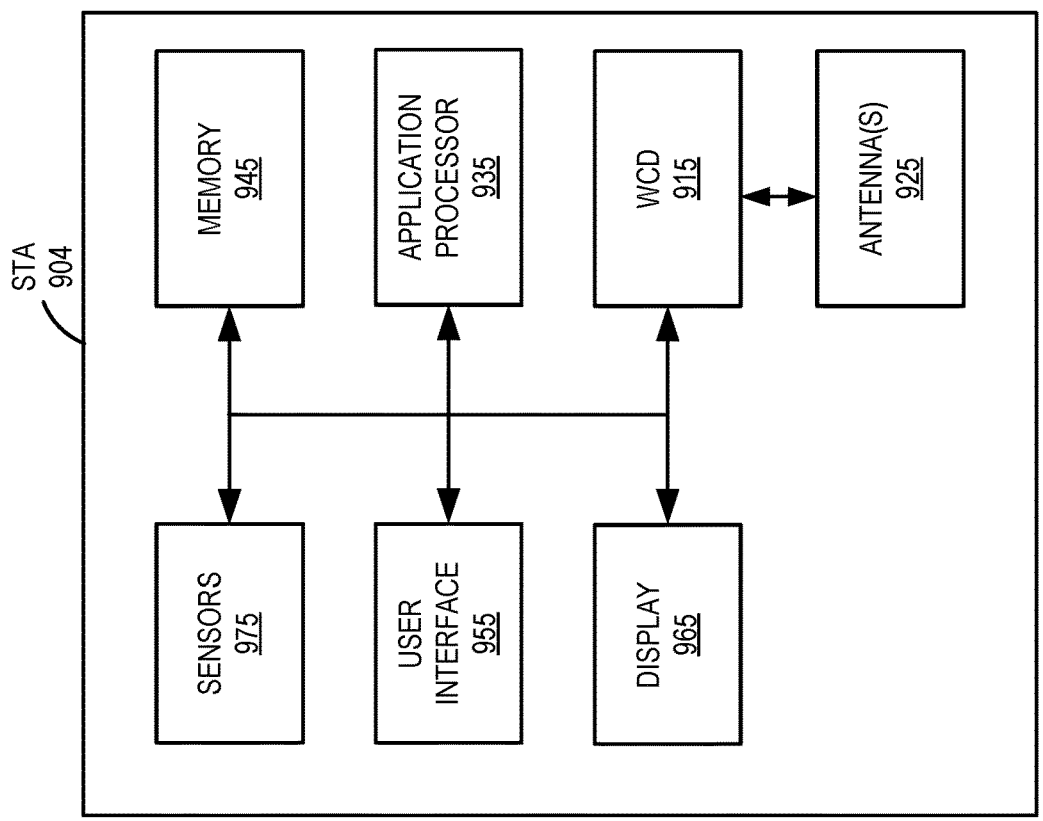
FIG. 9B shows a block diagram of an example STA.
Figure 9A:
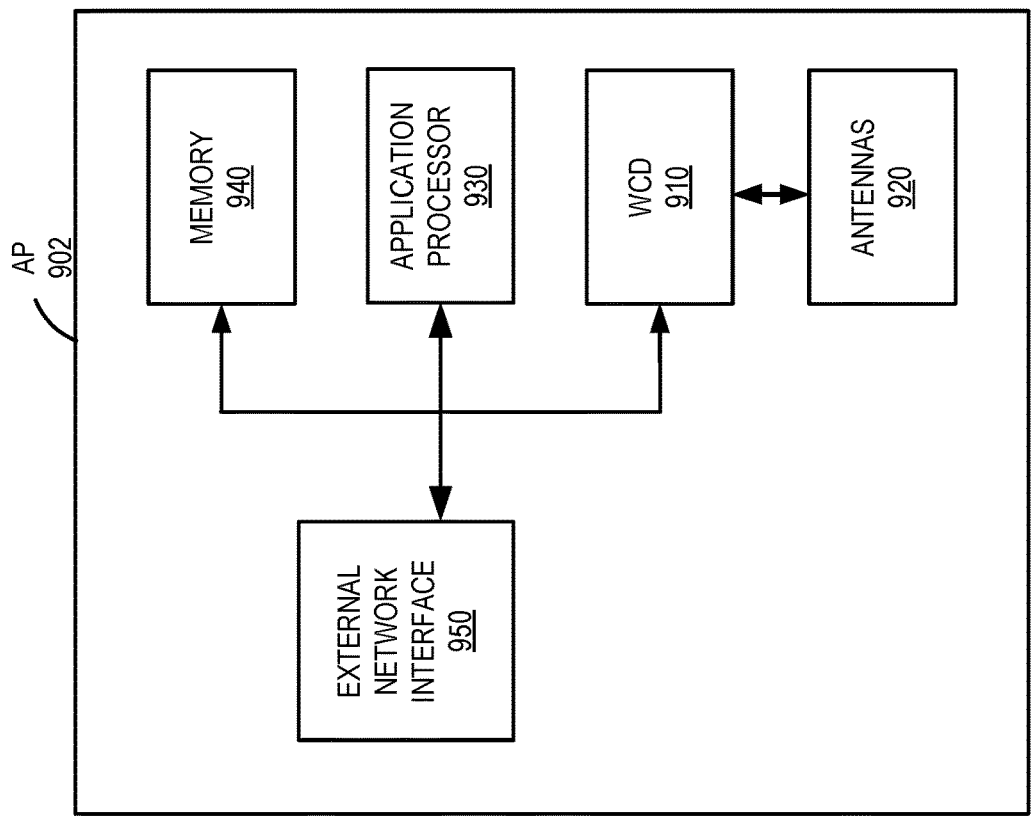
FIG. 9A shows a block diagram of an example AP.

FIG. 9A shows a block diagram of an example AP 902. For example, the AP 902 can be an example implementation of the AP 102 described with reference to FIG. 1. The AP 902 includes a wireless communication device (WCD) 910. For example, the wireless communication device 910 may be an example implementation of the wireless communication device 800 described with reference to FIG. 8. The AP 902 also includes multiple antennas 920 coupled with the wireless communication device 910 to transmit and receive wireless communications. In some implementations, the AP 902 additionally includes an application processor 930 coupled with the wireless communication device 910, and a memory 940 coupled with the application processor 930. The AP 902 further includes at least one external network interface 950 that enables the AP 902 to communicate with a core network or backhaul network to gain access to external networks including the Internet. For example, the external network interface 950 may include one or both of a wired (for example, Ethernet) network interface and a wireless network interface (such as a WWAN interface). Ones of the aforementioned components can communicate with other ones of the components directly or indirectly, over at least one bus. The AP 902 further includes a housing that encompasses the wireless communication device 910, the application processor 930, the memory 940, and at least portions of the antennas 920 and external network interface 950.

FIG. 9B shows a block diagram of an example STA 904. For example, the STA 904 can be an example implementation of the STA 104 described with reference to FIG. 1. The STA 904 includes a wireless communication device 915. For example, the wireless communication device 915 may be an example implementation of the wireless communication device 800 described with reference to FIG. 8. The STA 904 also includes one or more antennas 925 coupled with the wireless communication device 915 to transmit and receive wireless communications. The STA 904 additionally includes an application processor 935 coupled with the wireless communication device 915, and a memory 945 coupled with the application processor 935. In some implementations, the STA 904 further includes a user interface (UI) 955 (such as a touchscreen or keypad) and a display 965, which may be integrated with the UI 955 to form a touchscreen display. In some implementations, the STA 904 may further include one or more sensors 975 such as, for example, one or more inertial sensors, accelerometers, temperature sensors, pressure sensors, or altitude sensors. Ones of the aforementioned components can communicate with other ones of the components directly or indirectly, over at least one bus. The STA 904 further includes a housing that encompasses the wireless communication device 915, the application processor 935, the memory 945, and at least portions of the antennas 925, UI 955, and display 965.

As described above, as new wireless communication protocols enable larger bandwidth wireless channels it is desirable to enable sharing of a wireless channel by different types of devices and different BSSs. Various implementations relate generally to physical layer control signaling to control subchannel assignments or other physical layer configurations.

Figure 10:
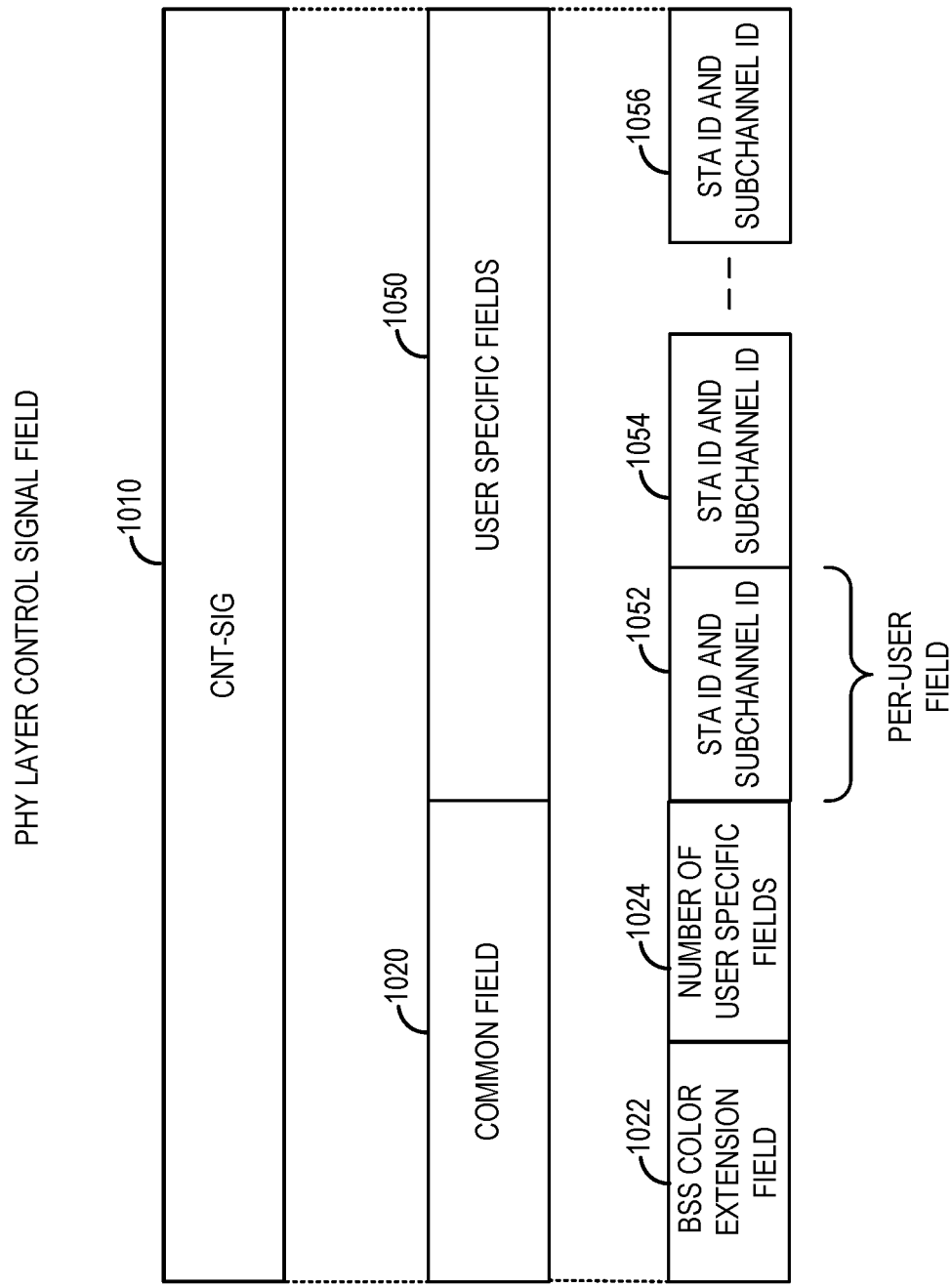
FIG. 10 shows an example of PHY layer control signaling according to some implementations.

FIG. 10 shows an example of PHY layer control signaling. The PHY layer control signaling may be included in a CNT-SIG 1010. The CNT-SIG 1010 may be an example of the CNT-SIG 718 described with reference to FIG. 7. The CNT-SIG 1010 may be formatted to include a common field 1020 and one or more user specific fields 1050.

The common field 1020 may include a BSS color extension field 1022 and a field to indicate the number of user specific fields 1024. The BSS color extension field 1022 is further described with reference to FIG. 13.

FIG. 10 shows multiple user specific fields 1050. In the example of FIG. 10, the user specific fields 1050 are per-user fields 1052, 1054, and 1056. Each per-user field may include a STA ID and a subchannel ID, as described with reference to FIG. 11. Alternatively, or additionally, the user specific fields 1050 may include one or more BSS user fields as described with reference to FIG. 12.

Figure 11:
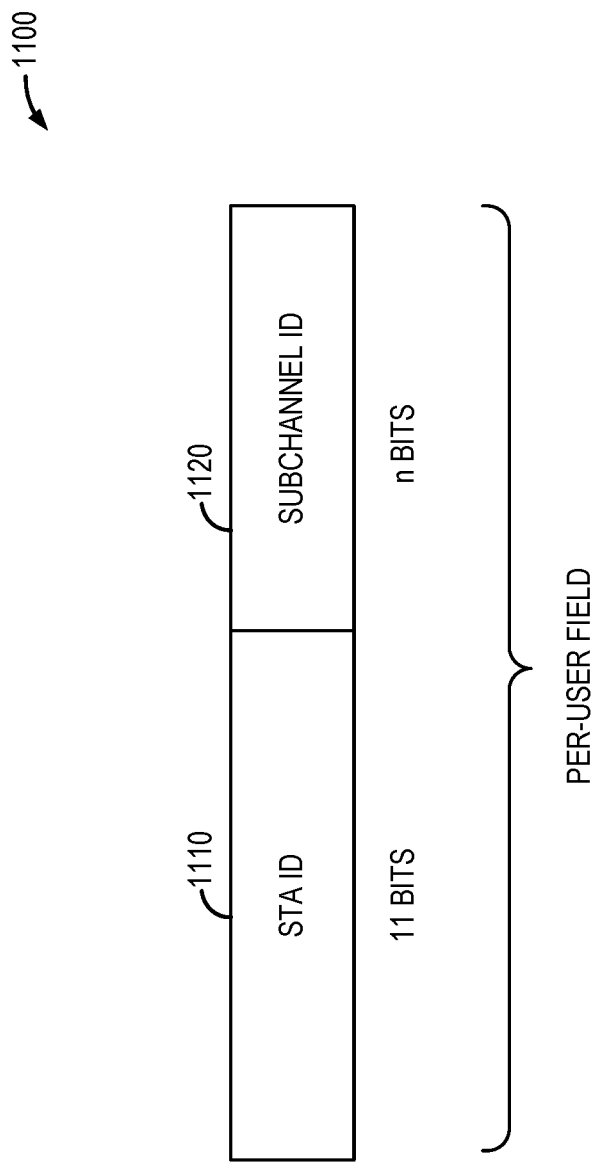
FIG. 11 shows an example of a per-user field.

FIG. 11 shows an example of a per-user field 1100. The per-user field 1100 may include a STA ID 1110. For example, the STA ID 1110 may be an 11-bit value that identifies a particular STA. The per-user field 1100 also may include a subchannel identifier (subchannel ID 1120). The length of the subchannel ID 1120 is n bits (n to be determined by a technical specification).

When a STA determines that the per-user field 1100 includes its STA ID in the STA ID field 1110, that STA may determine which subchannel is indicated by the subchannel ID 1120. The STA may change its PHY layer configuration to tune to the identified subchannel for a subsequent PPDU (such as a data PPDU). For example, the STA may move to the indicated subchannel within a SIFS period after the end of the first PPDU having PHY layer control signaling. The STA may stay on its assigned subchannel for at least a minimum wait time period to detect the data PPDU. However, there is a possibility that the data PPDU may become corrupt or undetectable. Therefore, in some implementations, the STA may return to a primary subchannel if the data PPDU is not detected within the wait time period. Using the example in FIG. 6, if the STA 104 does not detect the second PPDU 620, the STA 104 may return to the primary 80 MHz subchannel 650 to detect for further signaling or recover its association with a BSS. These safeguards may enable the STA 104 to remain in a sub-bandwidth operating mode while accounting for potential loss of the second PPDU 620. In some implementations, the STA may stay on the assigned subchannel until a new subchannel assignment is received (in a subsequent PPDU having PHY layer control signaling). Alternatively, or additionally, the STA may remain on the assigned subchannel for one data PPDU or until the STA sends an acknowledgement (or block acknowledgement) on the assigned subchannel.

In IEEE 802.11be, the largest supported wireless channel bandwidth is expected to be 320 MHz bandwidth. There are thirty potential subchannels that may be defined within the 320 MHz bandwidth. For example, within the 320 MHz total bandwidth of the wireless channel, there may be potentially two 160 MHz bandwidth subchannels, four 80 MHz bandwidth subchannels, eight 40 MHz bandwidth subchannels, and sixteen 20 MHz bandwidth subchannels. The present disclosure may have flexibility to identify any of the potential subchannels for a particular STA or BSS. Each potential subchannel may be identified by a unique 5-bit value in a subchannel ID lookup table. In some implementations, the present disclosure may support greater bandwidths. For example, if the length n of the subchannel ID 1120 field was 6 bits, the subchannel ID lookup table could include unique identifiers for up to 640 MHz bandwidth and may have available reserved values for further enhancements.

Figure 12:
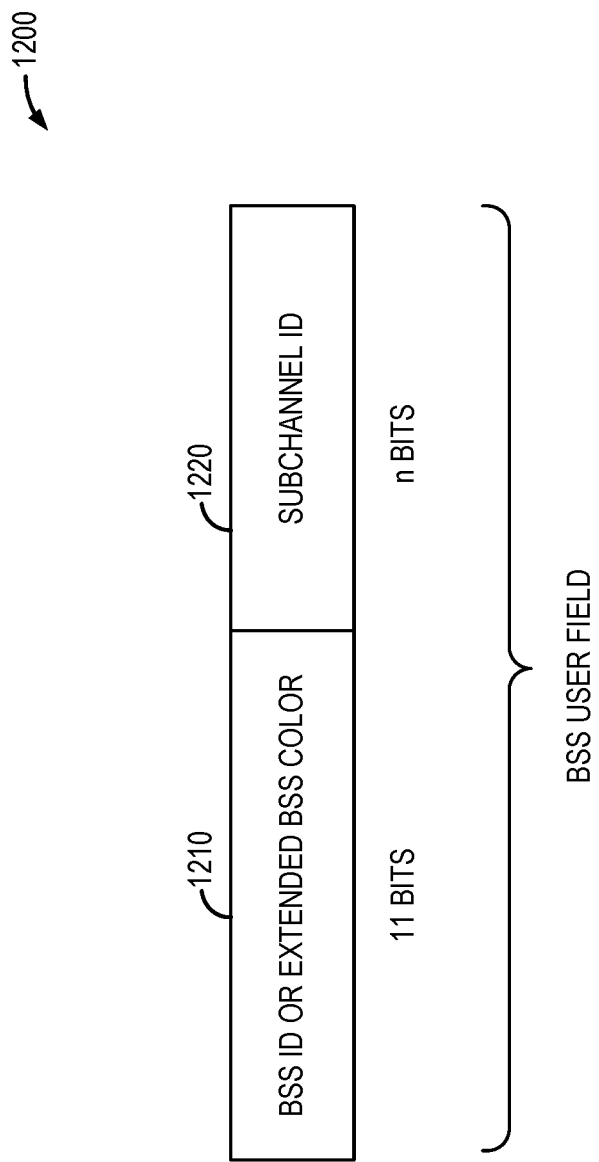
FIG. 12 shows an example of a BSS user field.
Figure 13:
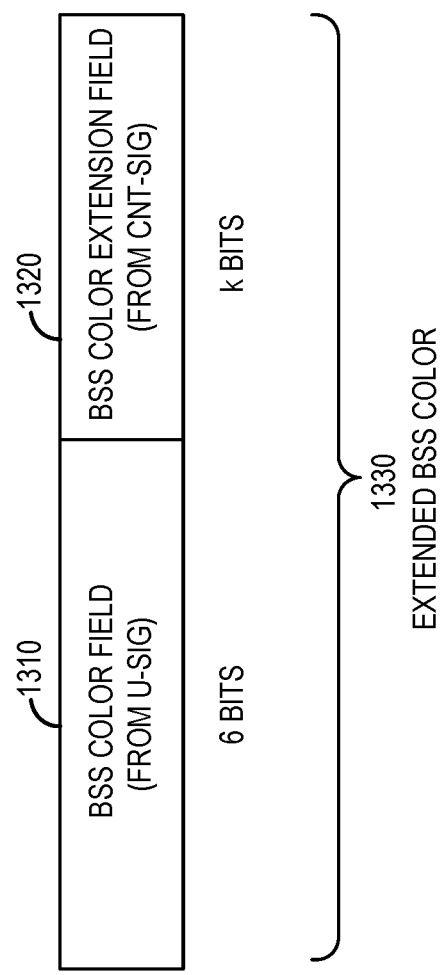
FIG. 13 shows an example of an extended BSS color.

FIG. 12 shows an example of a BSS user field 1200. The BSS user field 1200 may include a BSS ID or BSS color extension field 1210 and a subchannel ID 1220. The subchannel ID 1220 may be a 5-bit or 6-bit value as described with reference to the subchannel ID 1120 of FIG. 11. In some implementations, the BSS ID or BSS color extension field 1210 may be an 11-bit value so that the BSS user field 1200 has the same bit length as the per-user field 1100. The BSS ID or BSS color extension field 1210 may be used to identify a BSS. FIG. 13 includes a description of how an extended BSS color may be determined based on the BSS ID or BSS color extension field 1210. When any STA receives the BSS user field 1200, the STA may determine if the BSS identified by the BSS ID or BSS color extension field 1210 corresponds to the BSS to which that STA is associated. If so, that STA may move to the assigned subchannel indicated by the subchannel ID 1220. This technique may be used to move all STAs within a BSS to an assigned subchannel. For example, this technique may support the arrangement of BSSs in a data PPDU transmitted using Co-OFDMA.

FIG. 13 shows an example of an extended BSS color. In a wireless local area network, a BSS color may be used to uniquely identify a BSS. Typically, the BSS color is a 6-bit value that is signaled in an existing field (such as the U-SIG) of a PPDU. However, when the number of APs deployed in an environment is increased, there is a possibility of a BSS color collision. A BSS color collision refers to an incident when two or more BSSs use a same BSS color. The probability of a BSS color collision may increase when multiple BSSs are sharing a wireless channel using Co-OFDMA. Some implementations of this disclosure involve the movement of a BSS to a particular subchannel within the wireless channel. Therefore, a BSS color collision is undesirable. To address this concern, this disclosure provides a technique for creating an extended BSS color having a longer bit length and lower probability of BSS color collision.

As described in FIG. 10, the CNT-SIG may include a BSS color extension field 1320. The BSS color extension may be k bits (k to be determined by a technical specification). For example, the BSS color extension may be a 4-bit value or a 5-bit value. An Extended BSS Color 1330 may be constructed by concatenating the BSS color field 1310 (such as from the U-SIG) and the BSS color extension field 1320 (from a common field of the CNT-SIG). Thus, the extended BSS color may be (k+6) bits long. Although the BSS color extension field 1320 is shown in FIG. 13 as appended to the BSS color field 1310, in some other implementations, the BSS color extension field 1320 may be prepended, interleaved, or otherwise combined, with the BSS color field 1310 to construct the extended BSS color 1330.

Figure 14:
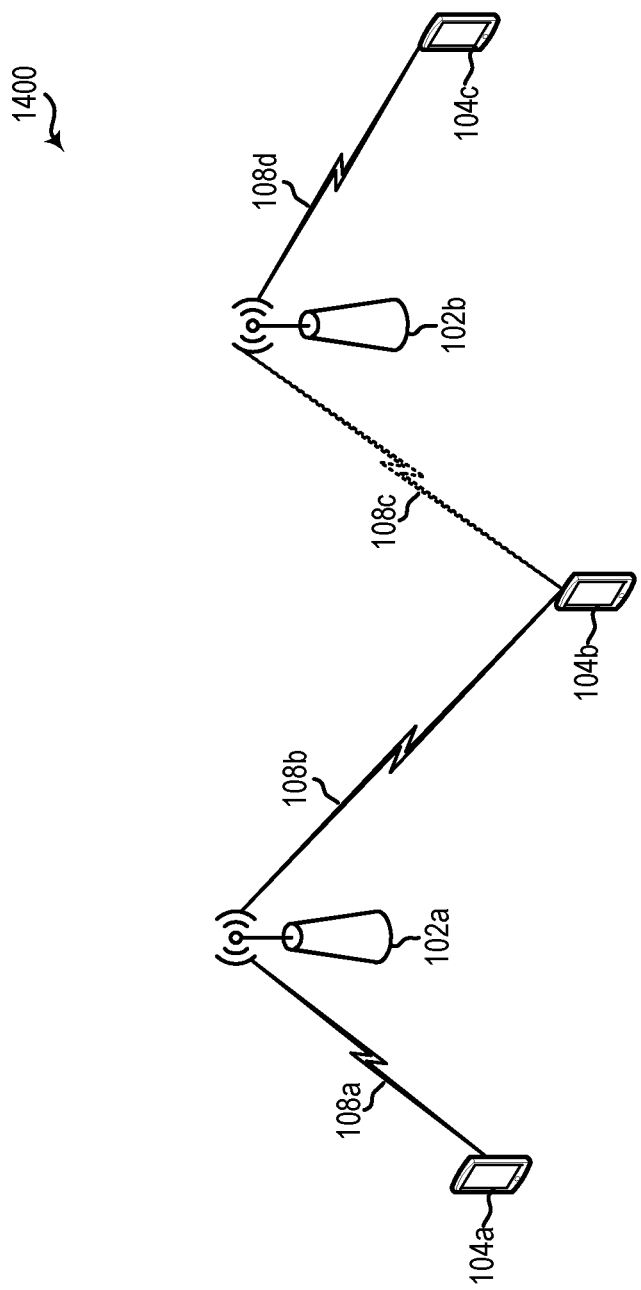
FIG. 14 shows an example in which multiple APs concurrently transmit a PPDU with physical layer control signaling.
Figure 15A:
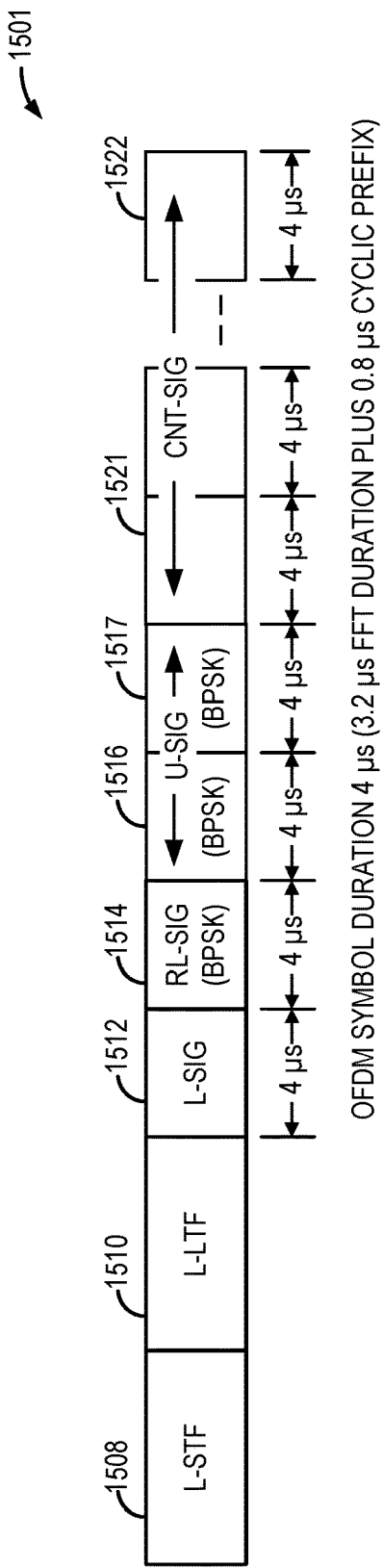
FIG. 15A shows an example of a first PPDU in which the PHY layer control signaling is transmitted using OFDM symbols having a first cyclic prefix length.
Figure 15B:
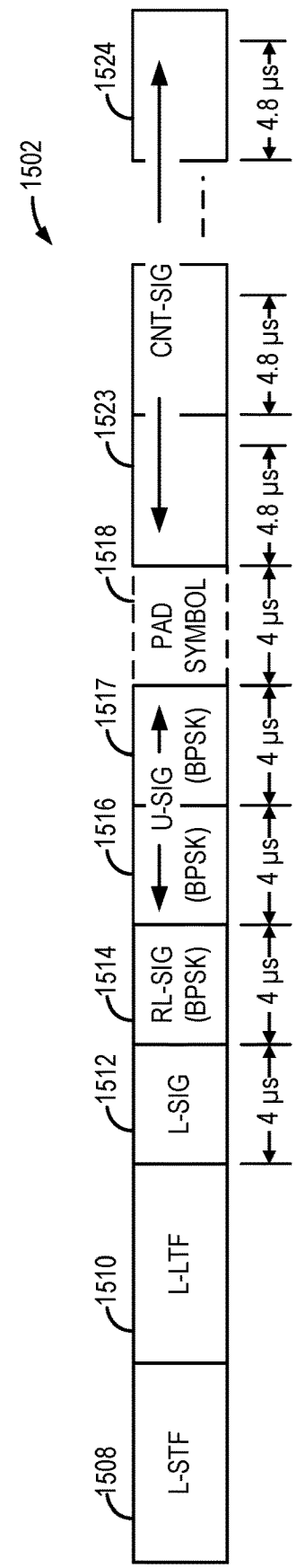
FIG. 15B shows an example of the first PPDU in which the PHY layer control signaling is transmitted using OFDM symbols having a second cyclic prefix length.

FIG. 14 shows an example 1400 in which multiple APs concurrently transmit a PPDU with physical layer control signaling. There may be cases when it is useful for the same PPDU with PHY layer control signaling to be sent simultaneously by multiple APs, such as APs 102*s* and 102*b*. For example, in a setup phase for Co-OFDMA, a first PPDU may include PHY layer control signaling to move STAs from each of the APs 102*a* and 102*b* to different subchannels just before the Co-OFDMA data PPDU. To ensure that all the STAs receive the first PPDU, both the APs 102*a* and 102*b* may transmit the same first PPDU. Doing so may prevent hidden node or path loss issues which could sever a STA from its BSS. In the example of FIG. 14, the APs 102*a* and 102*b* may sent the same first PPDU to the STAs 104*a*, 104*b* and 104*c*. A first STA 104*a* associated with the first AP 102*a* may receive the first PPDU via wireless link 108*a*. A second STA 104*b* associated with the first AP 102*a* may receive the first PPDU via wireless link 108*b*. A third STA 104*c* associated with the second AP 102*b* may receive the first PPDU via wireless link 108*d*. Since the first PPDU transmitted by both APs is the same, it typically is not a problem for a STA to receive the first PPDU from multiple APs. For example, the second STA 104*b* may receive the first PPDU via its wireless link 108*b* with the first AP 102*a* as well as via an overlapping signal 108*c* from the second AP 102*b*. The STA 104*b* can receive the superposition of the PPDU waveforms from both APs. STAs are capable of handling acceptable path loss or multipath delay spread when receiving overlapping signals from multiple APs or via multiple paths. However, due to timing errors between the two APs the effective multipath delay spread may be larger than would normally occur for a PPDU received from a single AP. To overcome potentially larger multipath delay spread, the first PPDU may be transmitted using a larger cyclic prefix in some implementations. FIGS. 15A and 15B are provided to illustrate the different cyclic prefix lengths.

FIG. 15A shows an example of a first PPDU 1501 in which the PHY layer control signaling is transmitted using OFDM symbols having a first cyclic prefix length. The first PPDU 1501 includes the L-STF 1508, the L-LTF 1510, the L-SIG 1512, and the RL-SIG 1514 followed by the U-SIG and the CNT-SIG. The L-SIG 1512 and the RL-SIG 1514 may each be a single OFDM symbol. The U-SIG may occupy two OFDM symbols 1516 and 1517. The CNT-SIG may occupy multiple OFDM symbols 1512-1522. In the first PPDU 1501 each of the OFDM symbols may have an OFDM symbol duration of 4 µs (which includes a 3.2 µs FFT duration plus a 0.8 µs cyclic prefix). The 0.8 µs cyclic prefix may be acceptable when receiving the first PPDU 1501 from a single AP. However, to accommodate a potentially larger multipath delay spread between first PPDUs from multiple APs, a larger cyclic prefix may be desirable.

FIG. 15B shows an example of the first PPDU 1502 in which the PHY layer control signaling is transmitted using OFDM symbols having a second cyclic prefix length. The first PPDU 1502 includes the same fields and OFDM symbol durations for the L-STF 1508, the L-LTF 1510, the L-SIG 1512, the RL-SIG 1514, and the OFDM symbols 1516 and 1517 of the U-SIG. However, the CNT-SIG may be transmitted using OFDM symbols having a duration 4.8 µs (3.2 µs FFT duration plus 1.6 µs cyclic prefix). The larger cyclic prefix enables a STA to combine the OFDM symbols of the first PPDU received from multiple APs at potentially slightly different times. Furthermore, the larger cyclic prefix may enable the CNT-SIG to be signaled at a higher MCS than the MCS0 (MCS0, BPSK, rate ½ convolutional code) used to signal the U-SIG.

There may be different options for supporting the larger cyclic prefix in the CNT-SIG. For example, a technical specification may specify that the long cyclic prefix is always used for the CNT-SIG. In this example, a single bit in the U-SIG may indicate that the first PPDU is a PHY control PPDU and a receiving STA would automatically use the long cyclic prefix when decoding the CNT-SIG. In another option, the technical specification may specify that both cyclic prefix options (as shown in FIGS. 15A and 15B) are supported. In this example, a version identifier or other indicator in the U-SIG may indicate which cyclic prefix is used for the CNT-SIG.

In some implementations, the STA may require time to decode the U-SIG to determine that the first PPDU is a PHY control PPDU or the cyclic prefix of the CNT-SIG. Furthermore, processing of the U-SIG may take some time such that initial processing of a next OFDM symbol may be received before takes some time, and so initial processing of the next OFDM symbol may already be ongoing before decoding of U-SIG is complete. Thus, in some implementations, the first PPDU 1502 may include an extra pad symbol 1518 following the U-SIG and before the OFDM symbols 1523-1524 of the CNT-SIG.

The techniques associated with using a larger cyclic prefix described in FIG. 15B also may be used for other types of PPDUs (beyond the first PPDU having PHY layer control signaling). For example, in some implementations, using a larger cyclic prefix may be useful in some joint transmissions of non-data packet (NDP) PPDUs, such as those used for joint sounding of the channel in preparation for a Multi-AP (Multiple Access Point) joint transmission PPDU. In some implementations, an EHT-SIG field (not shown) may be signaled using a larger cyclic prefix compared to the standard cyclic prefix used for the U-SIG. The techniques may be, for example, for any type of PPDU that is simultaneously transmitted by multiple APs.

FIG. 16 shows a flowchart illustrating an example process 1600 for sending a PPDU with PHY layer control signaling. The process 1600 may be performed by a wireless communication device such as the wireless communication device 800 described with reference to FIG. 8. In some implementations, the process 1600 may be performed by a wireless communication device operating as or within an AP, such as one of the APs 102 and 902 described with reference to FIGS. 1 and 9A, respectively. In some implementations, the process 1600 may be performed by a wireless communication device operating as or within a STA, such as one of the STAs 104 and 904 described above with reference to FIGS. 1 and 9B, respectively. In block 1602, an apparatus may transmit, via a wireless channel, a first PPDU that includes PHY layer control signaling indicating an assigned subchannel of the wireless channel for at least one STA to receive a second PPDU. The second PPDU may occupy the assigned subchannel.

Figure 17:
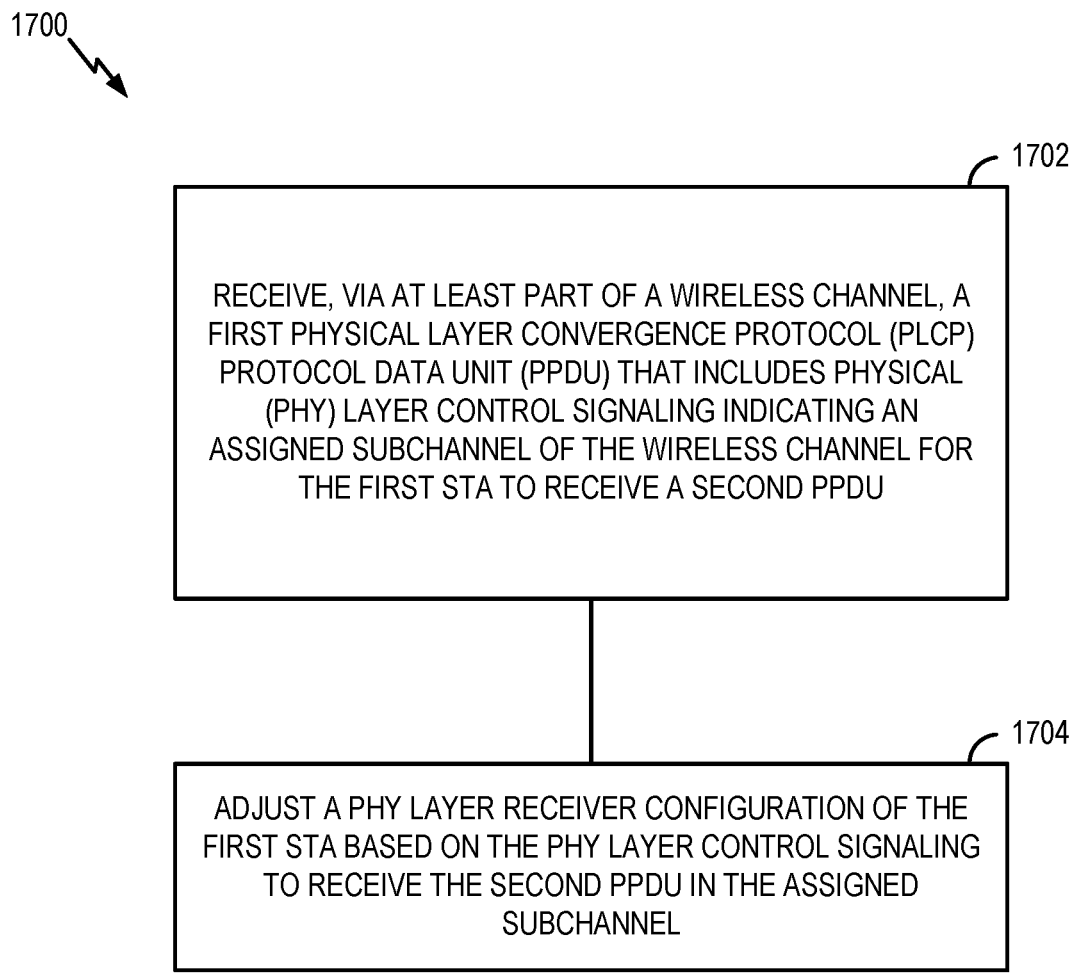
FIG. 17 shows a flowchart illustrating an example process for receiving a PPDU with PHY layer control signaling.

FIG. 17 shows a flowchart illustrating an example process 1700 for receiving a PPDU with PHY layer control signaling. The process 1700 may be performed by a wireless communication device such as the wireless communication device 800 described with reference to FIG. 8. In some implementations, the process 1700 may be performed by a wireless communication device operating as or within an AP, such as one of the APs 102 and 902 described with reference to FIGS. 1 and 9A, respectively. In some implementations, the process 1700 may be performed by a wireless communication device operating as or within a STA, such as one of the STAs 104 and 904 described with reference to FIGS. 1 and 9B, respectively.

In block 1702, an apparatus may receive, via at least part of a wireless channel, a first PPDU that includes PHY layer control signaling indicating an assigned subchannel of the wireless channel for the first STA to receive a second PPDU. In block 1704, the apparatus may adjust a PHY layer receiver configuration of the first STA based on the PHY layer control signaling to receive the second PPDU in the assigned subchannel.

Figure 18:
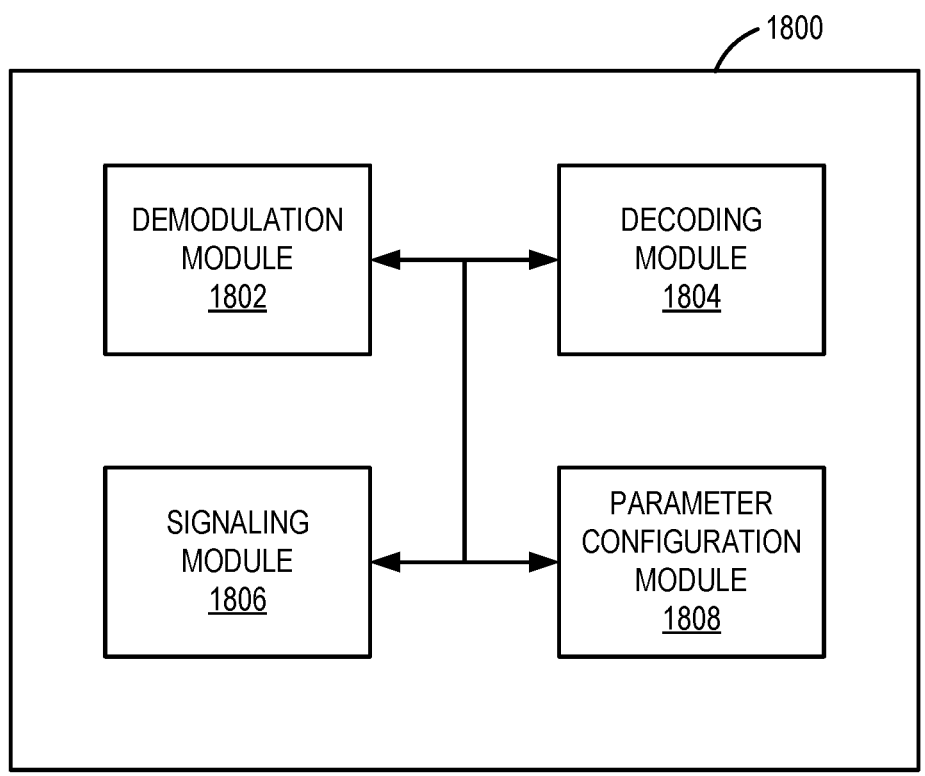
FIG. 18 shows a block diagram of an example wireless communication device.

FIG. 18 shows a block diagram of an example wireless communication device 1800. In some implementations, the wireless communication device 1800 is configured to perform one or more of the processes described above. The wireless communication device 1800 may be an example implementation of the wireless communication device 800 described with reference to FIG. 8. For example, the wireless communication device 1800 can be a chip, SoC, chipset, package or device that includes at least one processor and at least one modem (for example, a Wi-Fi (IEEE 802.11) modem or a cellular modem). In some implementations, the wireless communication device 1800 can be a device for use in an AP, such as one of the APs 102 and 902 described with reference to FIGS. 1 and 9A, respectively. In some implementations, the wireless communication device 1800 can be a device for use in a STA, such as one of the STAs 104 and 904 described with reference to FIGS. 1 and 9B, respectively. In some other implementations, the wireless communication device 1800 can be an AP or a STA that includes such a chip, SoC, chipset, package or device as well as at least one transmitter, at least one receiver, and at least one antenna.

The wireless communication device 1800 includes a demodulation module 1802, a decoding module 1804, a signaling module 1806 and a parameter configuration module 1808. Portions of one or more of the modules 1802, 1804, 1806 and 1808 may be implemented at least in part in hardware or firmware. For example, the demodulation module 1802, the decoding module 1804, the signaling module 1806 and the parameter configuration module 1808 may be implemented at least in part by a modem (such as the modem 802). In some implementations, portions of some of the modules 1802, 1804, 1806 or 1808 may be implemented at least in part as software stored in a memory (such as the memory 808). For example, portions of one or more of the modules 1802, 1804, 1806 or 1808 can be implemented as non-transitory instructions (or "code") executable by a processor (such as the processor 806) to perform the functions or operations of the respective module.

The demodulation module 1802 is configured to receive a PPDU that includes physical layer control signaling. The demodulation module 1802 is configured to demodulate the symbols in the received packet and to determine the modulation scheme that was used to module the symbols. In some implementations, the PPDU may be an example of the PPDU 700 described with reference to FIG. 7. As described above, in such implementations, the first portion includes a first signal field (L-SIG) and the second portion includes a repeat of L-SIG (RL-SIG) that immediately follows L-SIG. In some implementations, RL-SIG may be masked with a masking sequence and the demodulation module 1802 is further configured to unmask RL-SIG before demodulating it. The second portion further includes at least one additional signal field after RL-SIG. For example, the second portion of the preamble may include U-SIG and a CNT-SIG.

The decoding module 1804 is configured to decode the bits in the demodulated symbols and to interpret bits in the decoded bits based on a WLAN communication protocol.

The signaling module 1806 is configured to interpret signal fields of the packet in accordance with the implementations described above. For example, the signaling module 1806 may interpret signal fields using parallelization for different subbands or different subchannels of the wireless channel. The signaling module 1806 may interpret signaling regarding different content channels that follow the RL-SIG or the U-SIG. The signaling module 1806 may interpret a CNT-SIG field according to the any on the examples described herein. The parameter configuration module 1808 is configured to set a physical layer configuration setting based on physical layer control signaling in the CNT-SIG field.

Figure 19:
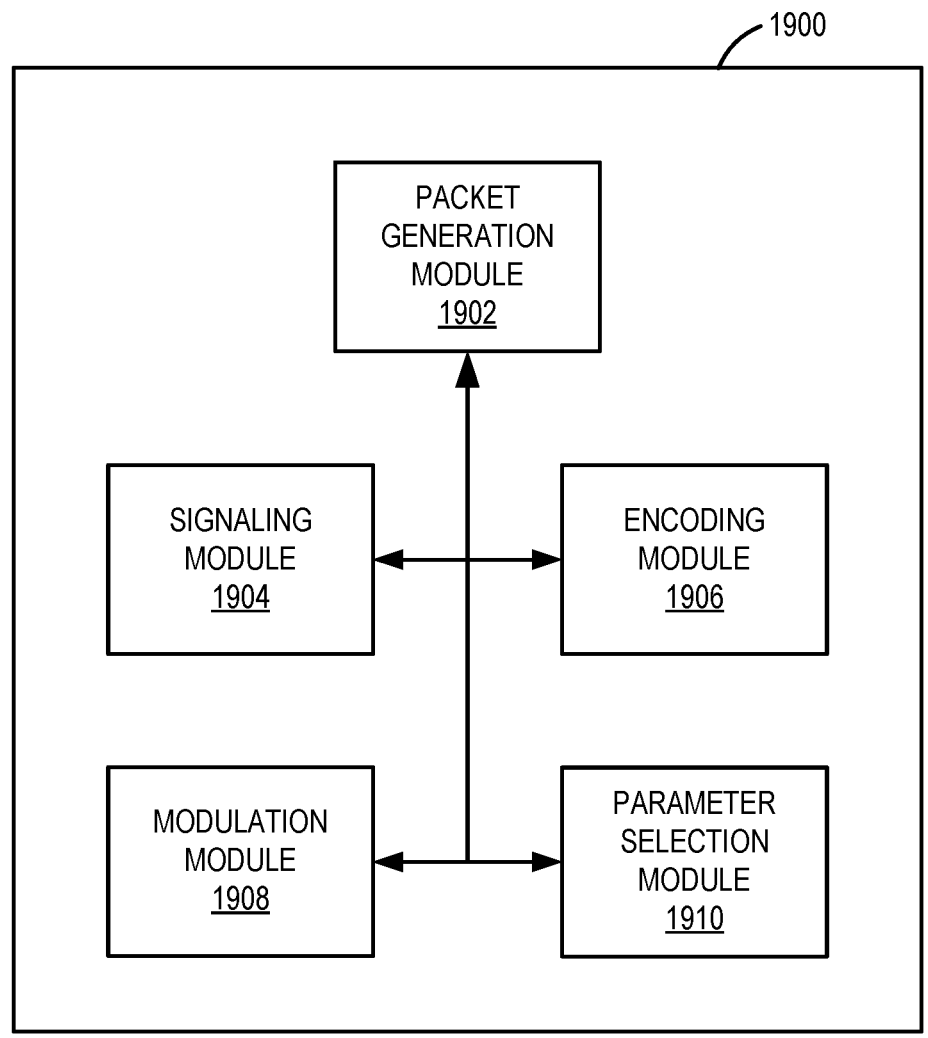
FIG. 19 shows a block diagram of an example wireless communication device.

FIG. 19 shows a block diagram of an example wireless communication device 1900. In some implementations, the wireless communication device 1900 is configured to perform one or more of the processes described above. The wireless communication device 1900 may be an example implementation of the wireless communication device 800 described with reference to FIG. 8. For example, the wireless communication device 1900 can be a chip, SoC, chipset, package or device that includes at least one processor and at least one modem (for example, a Wi-Fi (IEEE 802.11) modem or a cellular modem). In some implementations, the wireless communication device 1900 can be a device for use in an AP, such as one of the APs 102 and 902 described with reference to FIGS. 1 and 9A, respectively. In some implementations, the wireless communication device 1900 can be a device for use in a STA, such as one of the STAs 104 and 904 described with reference to FIGS. 1 and 9B, respectively. In some other implementations, the wireless communication device 1900 can be an AP or a STA that includes such a chip, SoC, chipset, package or device as well as at least one transmitter, at least one receiver, and at least one antenna.

The wireless communication device 1900 includes a packet generation module 1902, a signaling module 1904, an encoding module 1906, a modulation module 1908 and a parameter selection module 1910. Portions of one or more of the modules 1902, 1904, 1906, 1908 and 1910 may be implemented at least in part in hardware or firmware. For example, the packet generation module 1902, the signaling module 1904, the encoding module 1906, the modulation module 1908 and the parameter configuration module 1910 may be implemented at least in part by a modem (such as the modem 802). In some implementations, portions of some of the modules 1902, 1904, 1906, 1908 or 1910 may be implemented at least in part as software stored in a memory (such as the memory 808). For example, portions of one or more of the modules 1902, 1904, 1906 or 1908 can be implemented as non-transitory instructions (or "code") executable by a processor (such as the processor 806) to perform the functions or operations of the respective module.

The packet generation module 1902 is configured to generate a PPDU including physical layer signaling. In some implementations, the packet may be an example of the PPDU 700 described with reference to FIG. 7. As described above, in such implementations, the first portion includes a first signal field (L-SIG) and the second portion includes a repeat of L-SIG (RL-SIG) that immediately follows L-SIG. In some implementations, the packet generation module 1902 may be configured to mask RL-SIG with a masking sequence. The second portion further includes at least one additional signal field after RL-SIG. For example, the second portion of the preamble may include a U-SIG and a CNT-SIG field.

The signaling module 1904 is configured to prepare signal fields for the PPDU in accordance with the implementations described above. For example, the signaling module 1904 may prepare the CNT-SIG field. The modulation module 1908 is configured to modulate the symbols in the generated PPDU. The parameter selection module 1910 is configured to determine physical layer control settings to include in the CNT-SIG field.

Figure 20:
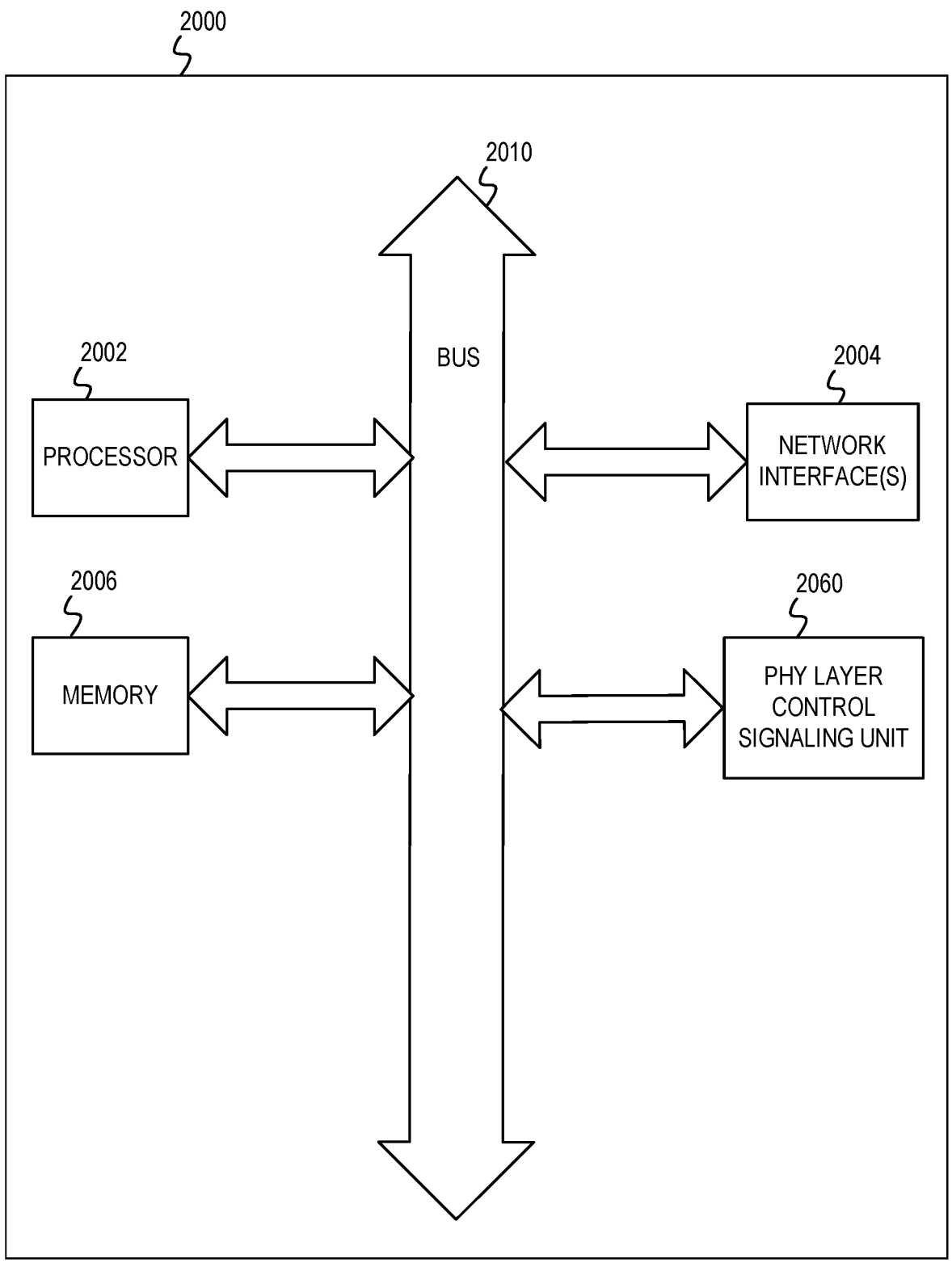
FIG. 20 shows a block diagram of an example electronic device.

FIG. 20 shows a block diagram of an example electronic device. In some implementations, the electronic device 2000 may be one of an access point (including any of the APs described herein), a range extender, or other electronic systems. The electronic device 2000 can include a processor 2002 (possibly including multiple processors, multiple cores, multiple nodes, or implementing multi-threading, etc.). The electronic device 2000 also can include a memory 2006. The memory 2006 may be system memory or any one or more of the possible realizations of computer-readable media described herein. The electronic device 2000 also can include a bus 2010 (such as PCI, ISA, PCI-Express, Hyper-Transport®, InfiniBand®, NuBus,® AHB, AXI, etc.), and a network interface 2004 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 2000 may support multiple network interfaces—each of which is configured to couple the electronic device 2000 to a different communication network.

The electronic device 2000 may include a PHY layer control signaling unit 2060. In some implementations, the PHY layer control signaling unit 2060 may be distributed within the processor 2002, the memory 2006, and the bus 2010. The PHY layer control signaling unit 2060 may perform some or all of the operations described herein.

The memory 2006 can include computer instructions executable by the processor 2002 to implement the functionality of the implementations described in FIGS. 1-19. Any of these functionalities may be partially (or entirely) implemented in hardware or on the processor 2002. For example, the functionality may be implemented with an application-specific integrated circuit, in logic implemented in the processor 2002, in a co-processor on a peripheral device or card, etc. Further, realizations may include fewer or additional components not illustrated in FIG. 20 (such as video cards, audio cards, additional network interfaces, peripheral devices, etc.). The processor 2002, the memory 2006, and the network interface 2004 may be coupled to the bus 2010. Although illustrated as being coupled to the bus 2010, the memory 2006 may be coupled to the processor 2002.

FIGS. 1-20 and the operations described herein are examples meant to aid in understanding example implementations and should not be used to limit the potential implementations or limit the scope of the claims. Some implementations may perform additional operations, fewer operations, operations in parallel or in a different order, and some operations differently.

The foregoing disclosure provides illustration and description but is not intended to be exhaustive or to limit the aspects to the precise form disclosed. Modifications and variations may be made in light of the above disclosure or may be acquired from practice of the aspects. While the aspects of the disclosure have been described in terms of various examples, any combination of aspects from any of the examples is also within the scope of the disclosure. The examples in this disclosure are provided for pedagogical purposes. Alternatively, or in addition to the other examples described herein, examples include any combination of the following implementation options (identified as clauses for brevity).

CLAUSES

Clause 1. A method for wireless communication by an apparatus of a first access point (AP) may include transmitting, via a wireless channel, a first physical layer convergence protocol (PLCP) protocol data unit (PPDU) that includes physical (PHY) layer control signaling indicating an assigned subchannel of the wireless channel for at least one station (STA) to receive a second PPDU, the second PPDU occupying the assigned subchannel.

Clause 2. The method of clause 1, where the first PPDU is a PHY control PPDU that precedes the second PPDU, and where the second PPDU is a data PPDU that includes data for the at least one STA in the assigned subchannel of the wireless channel.

Clause 3. The method of any one of clauses 1-2, where the PHY layer control signaling is included in a PHY layer control signal field (CNT-SIG) of the first PPDU.

Clause 4. The method of any one of clauses 1-3, where the CNT-SIG follows a universal signal field (U-SIG) of the first PPDU, and where the U-SIG includes an indicator to indicate that the CNT-SIG follows the U-SIG.

Clause 5. The method of any one of clauses 1-4, where the CNT-SIG is included in or replaces an Extremely High Throughput (EHT) signal field (EHT-SIG) after a universal signal field (U-SIG) in the first PPDU.

Clause 6. The method of any one of clauses 1-5, where the CNT-SIG follows an Extremely High Throughput (EHT) signal field (EHT-SIG) of the first PPDU, and where the EHT-SIG includes an indicator to indicate that the CNT-SIG follows the EHT-SIG.

Clause 7. The method of any one of clauses 1-6, where the PHY layer control signaling includes a basic service set (BSS) color extension field that is usable with a BSS color field of a universal signal field (U-SIG) of the first PPDU to identify an extended BSS color that is greater than 6 bits in length.

Clause 8. The method of any one of clauses 1-7, where the PHY layer control signaling is formatted to cause all STAs associated with the extended BSS color to utilize the assigned subchannel indicated in the PHY layer control signaling.

Clause 9. The method of any one of clauses 1-8, where the PHY layer control signaling includes one or more per-user fields, where each of the one or more per-user fields includes a station identifier (STA ID) and a subchannel identification (Subchannel ID) that indicates a respective assigned subchannel for the STA ID, and where the Subchannel ID is a selected value from a table that includes different values for different bandwidths or frequency ranges of subchannels within a total bandwidth of the wireless channel.

Clause 10. The method of any one of clauses 1-9, where the second PPDU is part of a collection of concurrently transmitted PPDUs in different subchannels of the wireless channel, and where the PHY layer control signaling includes one or more identifiers to cause the at least one STA to receive the second PPDU that occupies the assigned subchannel indicated in the PHY layer control signaling.

Clause 11. The method of any one of clauses 1-10, where the first PPDU is output during a set-up phase for coordinated orthogonal frequency division multiple access (Co-OFDMA), and where the second PPDU is part of Co-OFDMA transmission in which one AP transmits the second PPDU to the at least one STA on the assigned subchannel while other APs concurrently transmit different PPDUs on respective different subchannels.

Clause 12. The method of any one of clauses 1-11, where transmitting the first PPDU includes transmitting the first PPDU at a same time as a corresponding PPDU output by a second AP.

Clause 13. The method of any one of clauses 1-12, where each symbol of the PHY layer control signaling in the first PPDU is transmitted with a longer cyclic prefix compared to a standard cyclic prefix used for other symbols in a preamble of the first PPDU, the longer cyclic prefix to account for a multipath delay spread between corresponding transmissions of the first PPDU by both the first AP and a second AP.

Clause 14. The method of any one of clauses 1-13, where a universal signal field (U-SIG) of the first PPDU includes an indication that the symbols of the PHY layer control signaling is transmitted using the longer cyclic prefix, and where the first PPDU includes an extra pad symbol following the U-SIG and before the PHY layer control signaling.

Clause 15. The method of any one of clauses 1-14, where the PHY layer control signaling further includes a PHY layer transmission power setting, a PHY layer receiver gain setting, a modulation and coding rate for the second PPDU, decoding information to aid the at least one STA in decoding the second PPDU, a control setting that is specific to the second PPDU different from the first PPDU, or any combination thereof.

Clause 16. A method for wireless communication by an apparatus of a first station (STA), including receiving, via at least part of a wireless channel, a first physical layer convergence protocol (PLCP) protocol data unit (PPDU)

that includes physical (PHY) layer control signaling indicating an assigned subchannel of the wireless channel for the first STA to receive a second PPDU, and adjusting a PHY layer receiver configuration of the first STA based on the PHY layer control signaling to receive the second PPDU in the assigned subchannel.

Clause 17. The method of clause 16, where the PHY layer control signaling is formatted to cause the first STA to tune the PHY layer receiver configuration based on the assigned subchannel of a wireless channel for at least the second PPDU.

Clause 18. The method of any one of clauses 16-17, further including adjusting the PHY layer receiver configuration within a time period associated with an interframe space following the first PPDU.

Clause 19. The method of any one of clauses 16-18, further including maintaining the PHY layer receiver configuration until a condition is met. The condition may include successful reception and acknowledgement of the second PPDU on the assigned subchannel, reception of different PHY layer control signaling indicating a change to the assigned subchannel, expiration of a time out period during which the first STA does not receive a further PPDU addressed to the first STA on the assigned subchannel, reception of a predetermined quantity of PPDUs on the assigned subchannel, reception of an indicated quantity of PPDUs on the assigned subchannel, the indicated quantity being indicated in the first PPDU or the second PPDU, or any combination thereof.

Clause 20. The method of any one of clauses 16-19, further including receiving the second PPDU on the assigned subchannel, and transmitting an acknowledgement to the second PPDU on the assigned subchannel.

Clause 21. The method of any one of clauses 16-20, further including providing information regarding the PHY layer receiver configuration of the first STA to a media access control (MAC) layer of the first STA.

Clause 22. An apparatus of a first access point (AP), including at least one modem configured to output, via a wireless channel, a first physical layer convergence protocol (PLCP) protocol data unit (PPDU) that includes physical (PHY) layer control signaling indicating an assigned subchannel of the wireless channel for at least one station (STA) to receive a second PPDU, the second PPDU occupying the assigned subchannel.

Clause 23. The apparatus of clause 22, where the PHY layer control signaling is included in a PHY layer control signal field (CNT-SIG) of the first PPDU, and where the CNT-SIG is included in, replaces, or follows an Extremely High Throughput (EHT) signal field (EHT-SIG) after a universal signal field (U-SIG) in the first PPDU.

Clause 24. The apparatus of any one of clauses 22-23, where the second PPDU is part of a collection of concurrently transmitted PPDUs in different subchannels of the wireless channel, and where the PHY layer control signaling includes one or more identifiers to cause the at least one STA to receive the second PPDU that occupies the assigned subchannel indicated in the PHY layer control signaling.

Clause 25. The apparatus of any one of clauses 22-24, where the first PPDU is output during a set-up phase for coordinated orthogonal frequency division multiple access (Co-OFDMA), and where the second PPDU is part of Co-OFDMA transmission in which one AP transmits the second PPDU to the at least one STA on the assigned subchannel while other APs concurrently transmit different PPDUs on respective different subchannels.

Clause 26. The apparatus of any one of clauses 22-25, further including at least one processor, at least one transceiver coupled to the at least one modem, at least one antenna coupled to the at least one transceiver to wirelessly transmit signals output from the at least one transceiver and to wirelessly receive signals for input into the at least one transceiver, and a housing that encompasses at least the at least one processor, the at least one modem, the at least one transceiver, and at least a portion of the at least one antenna.

Clause 27. An apparatus of a first station (STA) for wireless communication, including at least one modem configured to obtain, via at least part of a wireless channel, a first physical layer convergence protocol (PLCP) protocol data unit (PPDU) that includes physical (PHY) layer control signaling indicating an assigned subchannel of the wireless channel for the first STA to receive a second PPDU. The apparatus may include at least one processor configured to adjust a PHY layer receiver configuration of the at least one modem based on the PHY layer control signaling. The at least one modem may be configured to obtain the second PPDU via the assigned subchannel.

Clause 28. The apparatus of clause 27, where the at least one processor is configured to adjust the PHY layer receiver configuration within a time period associated with an interframe space following the first PPDU.

Clause 29. The apparatus of any one of clauses 27-28, where the at least one modem is configured to obtain the second PPDU on the assigned subchannel and output an acknowledgement to the second PPDU via the assigned subchannel.

Clause 30. The apparatus of any one of clauses 27-29, further including at least one transceiver coupled to the at least one modem, at least one antenna coupled to the at least one transceiver to wirelessly transmit signals output from the at least one transceiver and to wirelessly receive signals for input into the at least one transceiver, and a housing that encompasses at least the at least one processor, the at least one modem, the at least one transceiver, and at least a portion of the at least one antenna.

Clause 31. A method for wireless communication by an apparatus of a first access point (AP), including preparing a first physical layer convergence protocol (PLCP) protocol data unit (PPDU) that includes a physical (PHY) layer control signal field (CNT-SIG), the CNT-SIG including control signaling to adjust a PHY layer configuration of at least one station (STA) for at least a second PPDU that follows the first PPDU. The method may include outputting the first PPDU for transmission via a wireless channel.

Clause 32. The method of clause 31, where the first PPDU is a PHY control PPDU that precedes the second PPDU, the second PPDU being a data PPDU, and where the CNT-SIG indicates a subchannel assigned for the at least one STA to receive the data PPDU.

Clause 33. The method of any one of clauses 31-32, where the CNT-SIG follows a universal signal field (U-SIG) of the first PPDU, and where the CNT-SIG replaces an Extremely High Throughput (EHT) signal field (EHT-SIG) that would otherwise follow the U-SIG in a traditional PPDU format.

Clause 34. The method of any one of clauses 31-33, where the CNT-SIG includes channel move (CM) signaling to move one or more STAs to an assigned subchannel of the wireless channel for at least the second PPDU that follows the first PPDU.

Clause 35. The method of any one of clauses 31-34, where the CNT-SIG includes a common field that indicates a basic service set (BSS) color extension field and an indication of a quantity of one or more per-user fields. The CNT-SIG may include the one or more per-user fields.

Clause 36. The method of any one of clauses 31-35, where the BSS color extension field is usable with a BSS color field of a universal signal field (U-SIG) of the first PPDU to determine an extended BSS color.

Clause 37. The method of any one of clauses 31-36, where the extended BSS color is determined by concatenating the BSS color extension field with the BSS Color field, and where the extended BSS color is greater than 6 bits in length.

Clause 38. The method of any one of clauses 31-37, where each of the one or more per-user fields includes a station identifier (STA ID) and a subchannel identification (Subchannel ID) of the assigned subchannel for the STA ID.

Clause 39. The method of any one of clauses 31-38, where the Subchannel ID is a 5 bit or 6 bit value from a table, and where the table includes values for different bandwidths or frequency ranges of subchannels within a total bandwidth of the wireless channel.

Clause 40. The method of any one of clauses 31-39, where the CNT-SIG includes channel move (CM) signaling to move a group of STAs associated with a first basic service set (BSS) to an assigned subchannel of the wireless channel.

Clause 41. The method of any one of clauses 31-40, where the CNT-SIG includes a common field that indicates a basic service set (BSS) color extension field that is usable with a BSS color field of a universal signal field (U-SIG) of the first PPDU to determine an extended BSS color, and an indication to cause all STAs associated with the extended BSS color to utilize the assigned subchannel of the wireless channel.

Clause 42. The method of any one of clauses 31-41, where the indication to cause all STAs associated with the extended BSS color to utilize the assigned subchannel includes a BSS user field that includes the extended BSS color and a subchannel identification (Subchannel ID) of the assigned subchannel.

Clause 43. The method of any one of clauses 31-42, where the BSS user field is formatted according to a per-user field with a predetermined bit that signals that the per-user field includes the extended BSS color.

Clause 44. The method of any one of clauses 31-43, where the first PPDU is output during a set-up phase for coordinated orthogonal frequency division multiple access (Co-OFDMA) in which the first AP transmits the second PPDU on a first subchannel while other APs concurrently transmit different PPDUs on their respective different subchannels.

Clause 45. The method of any one of clauses 31-44, where outputting the first PPDU for transmission via the wireless channel includes outputting the first PPDU at same time as a corresponding PPDU output by a second AP.

Clause 46. The method of any one of clauses 31-45, where each symbol of the CNT-SIG in the first PPDU and the corresponding PPDU is output with a longer cyclic prefix compared to a standard cyclic prefix used for other symbols in a preamble of the first PPDU and the corresponding PPDU, the longer cyclic prefix to account for a multipath delay spread between corresponding transmissions of the first PPDU by both first AP and the second AP.

Clause 47. The method of any one of clauses 31-46, where the first PPDU and the corresponding PPDU include an extra pad symbol following a universal signal field (U-SIG) and before the CNT-SIG.

Clause 48. The method of any one of clauses 31-47, where the U-SIG includes an indicator to indicate that the CNT-SIG has the longer cyclic prefix in the first PPDU and the corresponding PPDU.

Clause 49. The method of any one of clauses 31-48, where the control signaling in the CNT-SIG includes a PHY layer transmission power setting, a PHY layer receiver gain setting, a modulation and coding rate for the second PPDU that follows the first PPDU, decoding information to aid the at least one STA in decoding the second PPDU, a control setting that is specific to the second PPDU different from the first PPDU, or any combination thereof.

Clause 50. The method of any one of clauses 31-49, where the first PPDU ends after the CNT-SIG and the first PPDU does not include a data payload after the control signaling.

Clause 51. A method for wireless communication by an apparatus of a first station (STA), including receiving a first physical layer convergence protocol (PLCP) protocol data unit (PPDU) that includes a physical (PHY) layer control signal field (CNT-SIG), the CNT-SIG including control signaling to adjust a PHY layer configuration of the first STA for at least a second PPDU that follows the first PPDU, and adjusting at least one PHY layer configuration of the first STA based on the control signaling in the CNT-SIG.

Clause 52. The method of clause 51, where the CNT-SIG includes channel move (CM) signaling to move the first STA to an assigned subchannel of a wireless channel for at least the second PPDU that follows the first PPDU.

Clause 53. The method of any one of clauses 51-52, further including adjusting the PHY layer configuration of the first STA to utilize the assigned subchannel within an interframe space time period following the first PPDU.

Clause 54. The method of any one of clauses 51-53, further including maintaining the PHY layer configuration until receiving further CM signaling or until a time out period during which the first STA does not receive a further PPDU addressed to the first STA on the assigned subchannel.

Clause 55. The method of any one of clauses 51-54, further including receiving the second PPDU following the first PPDU, the second PPDU received on the assigned subchannel, outputting an acknowledgement to the second PPDU on the assigned subchannel, and returning to a primary subchannel of the wireless channel after outputting the acknowledgement.

Clause 56. The method of any one of clauses 51-55, further including providing information from the PHY layer of the first STA to a media access control (MAC) layer of the first STA to indicate the adjusted PHY layer configuration.

Clause 57. A method for wireless communication by a wireless communication device including generating a first PPDU formatted according to any of the formats described in any one of clauses 1-21 and 31-56, modulating the packet, and transmitting the modulated packet for transmission to at least one wireless communication device.

Clause 58. A wireless communication device including at least one modem, at least one processor communicatively coupled with the at least one modem, and at least one memory communicatively coupled with the at least one processor and storing processor-readable code that, when executed by the at least one processor in conjunction with the at least one modem, is configured to perform the method of any one of clauses 1-21 and 31-56.

Clause 59. A mobile station including the wireless communication device of clause 58, at least one transceiver coupled to the at least one modem, at least one antenna coupled to the at least one transceiver to wirelessly transmit signals output from the at least one transceiver and to wirelessly receive signals for input into the at least one transceiver, and a housing that encompasses the at least one modem, the at least one processor, the at least one memory, the at least one transceiver and at least a portion of the at least one antenna.

Clause 60. A system including means for performing a method according to any one of clauses 1-21 and 31-56.

Another innovative aspect of the subject matter described in this disclosure can be implemented in a method for wireless communication by an apparatus. The method may include generating a first PPDU formatted according to any of the formats described in any one of the above methods. The method may include modulating the packet and transmitting the modulated packet for transmission to at least one wireless communication device.

Another innovative aspect of the subject matter described in this disclosure can be implemented as a computer-readable medium having stored therein instructions which, when executed by a processor, causes the processor to perform any one of the above methods.

Another innovative aspect of the subject matter described in this disclosure can be implemented as an apparatus having an interface for communicating via a wireless local area network and a processor. The processor may be configured to perform any one of the above methods.

Another innovative aspect of the subject matter described in this disclosure can be implemented as system including means for implementing any one of the above methods.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described throughout. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general-purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module that may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations also can be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communications by an apparatus of an access point (AP), comprising:
transmitting, via a wireless channel, a first physical layer convergence protocol (PLCP) protocol data unit (PPDU) indicating a common field and at least one per-user field following the common field, the common field being coded and the at least one per-user field being coded with a same coding, and the common field being separate from a universal signal field (U-SIG) in the first PPDU.

2. The method of claim 1, wherein the same coding of the common field and the at least one per-user field comprises a convolutional code.

3. The method of claim 1, wherein the common field and the at least one per-user field that are coded with the same coding are included in an Extremely High Throughput (EHT) signal field (EHT-SIG).

4. The method of claim 3, wherein the common field comprises a basic service set (BSS) color extension field and a field to indicate a quantity of the at least one per-user field included in the EHT-SIG.

5. The method of claim 3, wherein the EHT-SIG follows the U-SIG in the first PPDU.

6. The method of claim 3, wherein a physical (PHY) layer control signal field (CNT-SIG) is included in the EHT-SIG and follows the U-SIG in the first PPDU, the CNT-SIG being signaled at a higher modulation and coding scheme (MCS) than an MCS used to signal the U-SIG.

7. The method of claim 3, wherein a physical (PHY) layer control signal field (CNT-SIG) is included in the EHT-SIG and follows the U-SIG in the first PPDU, the CNT-SIG having a larger cyclic prefix length than a cyclic prefix length associated with the U-SIG.

8. An apparatus for wireless communications at an access point (AP), comprising:
a processing system that includes one or more processors and one or more memories coupled with the one or more processors, the processing system configured to cause the apparatus to:
transmit, via a wireless channel, a first physical layer convergence protocol (PLCP) protocol data unit (PPDU) indicating a common field and at least one per-user field following the common field, the common field being coded and the at least one per-user field being coded with a same coding, and the common field being separate from a universal signal field (U-SIG) in the first PPDU.

9. The apparatus of the AP of claim 8, wherein the same coding of the common field and the at least one per-user field comprises a convolutional code.

10. The apparatus of the AP of claim 8, wherein the common field and the at least one per-user field that are coded with the same coding are included in an Extremely High Throughput (EHT) signal field (EHT-SIG).

11. The apparatus of the AP of claim 10, wherein the common field comprises a basic service set (BSS) color extension field and a field to indicate a quantity of the at least one per-user field included in the EHT-SIG.

12. The apparatus of the AP of claim 10, wherein the EHT-SIG follows the U-SIG in the first PPDU.

13. The apparatus of the AP of claim 10, wherein a physical (PHY) layer control signal field (CNT-SIG) is included in the EHT-SIG and follows the U-SIG in the first PPDU, the CNT-SIG being signaled at a higher modulation and coding scheme (MCS) than an MCS used to signal the U-SIG.

14. The apparatus of the AP of claim 10, wherein a physical (PHY) layer control signal field (CNT-SIG) is included in the EHT-SIG and follows the U-SIG in the first PPDU, the CNT-SIG having a larger cyclic prefix length than a cyclic prefix length associated with the U-SIG.

15. A non-transitory computer-readable medium storing code for wireless communication, the code comprising instructions executable by one or more processors to:
transmit, via a wireless channel, a first physical layer convergence protocol (PLCP) protocol data unit (PPDU) indicating a common field and at least one per-user field following the common field, the common field being coded and the at least one per-user field being coded with a same coding, and the common field being separate from a universal signal field (U-SIG) in the first PPDU.

16. The non-transitory computer-readable medium of claim 15, wherein the same coding of the common field and the at least one per-user field comprises a convolutional code.

17. The non-transitory computer-readable medium of claim 15, wherein the common field and the at least one per-user field that are coded with the same coding are included in an Extremely High Throughput (EHT) signal field (EHT-SIG).

18. The non-transitory computer-readable medium of claim 17, wherein the common field comprises a basic service set (BSS) color extension field and a field to indicate a quantity of the at least one per-user field included in the EHT-SIG.

19. The non-transitory computer-readable medium of claim 17, wherein the EHT-SIG follows the U-SIG in the first PPDU.

20. The non-transitory computer-readable medium of claim 17, wherein a physical (PHY) layer control signal field (CNT-SIG) is included in the EHT-SIG and follows the U-SIG in the first PPDU, the CNT-SIG being signaled at a higher modulation and coding scheme (MCS) than an MCS used to signal the U-SIG.

* * * * *